(12) United States Patent
Tate et al.

(10) Patent No.: US 9,778,742 B2
(45) Date of Patent: Oct. 3, 2017

(54) GLOVE TOUCH DETECTION FOR TOUCH DEVICES

(71) Applicant: Parade Technologies, Ltd., Santa Clara, CA (US)

(72) Inventors: Daniel Tate, Wigginton (GB); Andriy Yarosh, Moggliu-Podilskyy (UA); Oleh Slezinskyy, Lviv (UA)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 0 days.

(21) Appl. No.: 13/895,110

(22) Filed: May 15, 2013

(65) Prior Publication Data

US 2013/0328828 A1    Dec. 12, 2013

Related U.S. Application Data

(60) Provisional application No. 61/658,524, filed on Jun. 12, 2012, provisional application No. 61/776,252, filed on Mar. 11, 2013.

(51) Int. Cl.
*G06F 3/041* (2006.01)
*G06F 3/044* (2006.01)
*G06F 3/01* (2006.01)

(52) U.S. Cl.
CPC .............. *G06F 3/014* (2013.01); *G06F 3/044* (2013.01)

(58) Field of Classification Search
USPC ..................... 345/156–184; 178/18.04–20.01
See application file for complete search history.

(56) References Cited

U.S. PATENT DOCUMENTS

| 4,680,429 A | 7/1987 | Murdock et al. |
| 5,053,757 A | 10/1991 | Meadows |

(Continued)

FOREIGN PATENT DOCUMENTS

| JP | 2007027034 A | 2/2007 |
| JP | 2008033701 A * | 2/2008 |
| JP | 2010034828 A * | 2/2010 |

OTHER PUBLICATIONS

Barrett L. Gary, "Decoding Touch Technology: An Insider's Guide to Choosing the Right Touch for Your Display", Touch International, 20 pages.

(Continued)

*Primary Examiner* — Ilana Spar
*Assistant Examiner* — Nguyen H Truong
(74) *Attorney, Agent, or Firm* — Morgan, Lewis & Bockius LLP

(57) ABSTRACT

Apparatuses and methods of glove touch detection are described. One method performs a first scan to detect an object proximate to a sense array. The first scan comprises a first sensitivity parameter. The method compares touch data from the first scan against a plurality of thresholds. The method performs a second scan to detect a touch event when the first scan's touch data exceeds a glove saturation threshold of the plurality of thresholds. The second scan comprising a second sensitivity parameter that is different than the first sensitivity parameter. The method reports a glove touch event when the first scan's touch data does not exceed the glove saturation threshold and exceeds a glove-reporting threshold of the plurality of thresholds.

15 Claims, 11 Drawing Sheets

(56) References Cited

U.S. PATENT DOCUMENTS

| | | | |
|---|---|---|---|
| 6,492,979 B1* | 12/2002 | Kent | G06F 3/0414 |
| | | | 178/18.01 |
| 6,504,530 B1 | 1/2003 | Wilson et al. | |
| 2009/0219175 A1* | 9/2009 | Takashima et al. | 341/20 |
| 2010/0194692 A1* | 8/2010 | Orr et al. | 345/173 |
| 2011/0050629 A1 | 3/2011 | Homma et al. | |
| 2011/0115732 A1 | 5/2011 | Coni et al. | |
| 2011/0175835 A1* | 7/2011 | Wang | 345/173 |
| 2011/0193809 A1 | 8/2011 | Walley et al. | |
| 2011/0261058 A1* | 10/2011 | Luo | 345/441 |
| 2011/0279364 A1* | 11/2011 | Koshiyama et al. | 345/156 |
| 2011/0291973 A1* | 12/2011 | Ito et al. | 345/173 |
| 2012/0050209 A1* | 3/2012 | King et al. | 345/174 |
| 2012/0050211 A1* | 3/2012 | King | G06F 3/0416 |
| | | | 345/174 |
| 2012/0092296 A1 | 4/2012 | Yanase et al. | |
| 2012/0128995 A1 | 5/2012 | Leto et al. | |
| 2012/0242584 A1* | 9/2012 | Tuli | 345/173 |
| 2012/0268411 A1 | 10/2012 | Chen et al. | |
| 2012/0287077 A1* | 11/2012 | Pant | G06F 3/044 |
| | | | 345/174 |
| 2013/0009906 A1* | 1/2013 | Posamentier | 345/174 |
| 2013/0050151 A1* | 2/2013 | Tu | G06F 3/0416 |
| | | | 345/178 |
| 2013/0285971 A1* | 10/2013 | Elias | G06F 3/044 |
| | | | 345/174 |
| 2013/0328616 A1* | 12/2013 | Buttolo | H03K 17/955 |
| | | | 327/517 |

OTHER PUBLICATIONS

Patentability Search for "Glove Touch Detection for Touch Devices", dated May 2013, 11 pages.

International Search Report and Written Opinion of the International Searching Authority for International Application No. PCT/US13/44087 dated Oct. 1, 2013; 13 pages.

Gary Barrett, "Projected-Capacitive Touch Technology," Information Display, vol. 26, Mar. 31, 2010, 6 pgs.

Juchmes et al., "Hover Sensing in Touch UI. EE Times—India," Jan. 11, 2012, 4 pgs.

Parade Technologies, Ltd, Extended European Search Report, EP13803634.8, dated Dec. 22, 2015, 12 pgs.

International Preliminary Report of Patentability, PCT/US2013/044087, dated Dec. 16, 2014, 12 pgs.

* cited by examiner

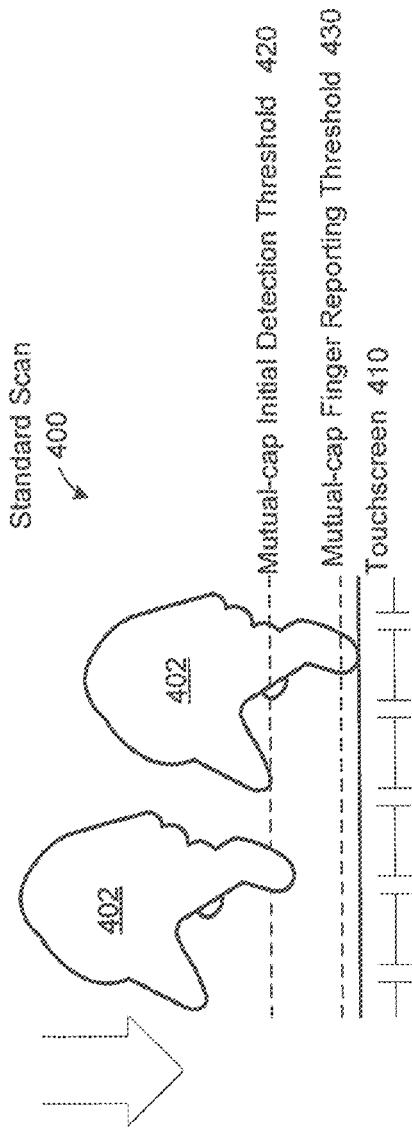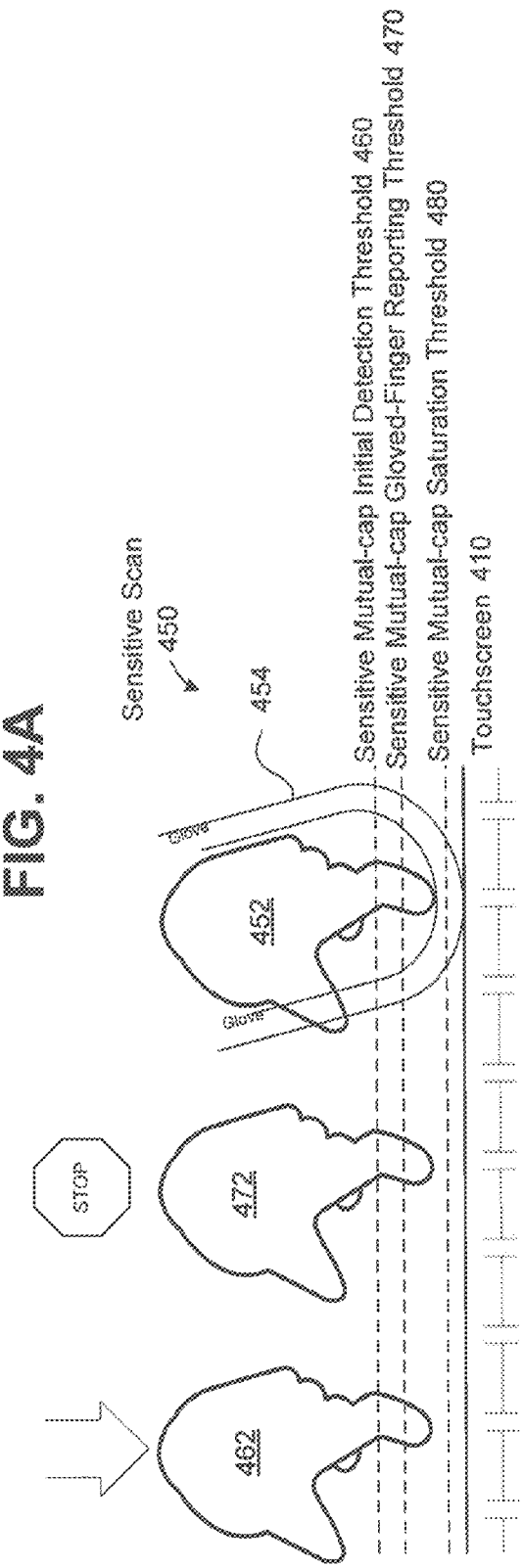
FIG. 4A
FIG. 4B

GLOVE TOUCH DETECTION FOR TOUCH DEVICES

RELATED APPLICATIONS

This application claims the benefit of U.S. Provisional Application No. 61/658,524, filed Jun. 12, 2012, and claims the benefit of U.S. Provisional Application No. 61/776,252, filed Mar. 11, 2013, the entire contents of which are incorporated by reference herein.

TECHNICAL FIELD

The present disclosure relates generally to sensing systems, and more particularly to capacitance-sensing systems configurable to glove touch detection on the capacitive-sensing systems.

BACKGROUND

Capacitance sensing systems can sense electrical signals generated on electrodes that reflect changes in capacitance. Such changes in capacitance can indicate a touch event (i.e., the proximity of an object to particular electrodes). Capacitive sense elements may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern customer applications, providing new user interface options in existing products. Capacitive sense elements can range from a single button to a large number arranged in the form of a capacitive sense array for a touch-sensing surface.

Transparent touch screens that utilize capacitive sense arrays are ubiquitous in today's industrial and consumer markets. They can be found on cellular phones, GPS devices, set-top boxes, cameras, computer screens, MP3 players, digital tablets, and the like. The capacitive sense arrays work by measuring the capacitance of a capacitive sense element, and looking for a delta in capacitance indicating a touch or presence of a conductive object. When a conductive object (e.g., a finger, hand, or other object) comes into contact or close proximity with a capacitive sense element, the capacitance changes and the conductive object is detected. The capacitance changes of the capacitive touch sense elements can be measured by an electrical circuit. The electrical circuit converts the measured capacitances of the capacitive sense elements into digital values.

There are two typical types of capacitance: 1) mutual capacitance where the capacitance-sensing circuit has access to both electrodes of the capacitor; 2) self-capacitance where the capacitance-sensing circuit has only access to one electrode of the capacitor where the second electrode is tied to a DC voltage level or is parasitically coupled to Earth Ground. A touch panel has a distributed load of capacitance of both types (1) and (2) and Cypress' touch solutions sense both capacitances either uniquely or in hybrid form with its various sense modes.

BRIEF DESCRIPTION OF THE DRAWINGS

The present invention is illustrated by way of example, and not of limitation, in the figures of the accompanying drawings.

FIG. 4A illustrates detection and reporting thresholds in a standard scan of a touchscreen according to one implementation.

FIG. 4B illustrates a detection threshold, a gloved-finger reporting threshold and a glove saturation threshold in a sensitive scan of a touchscreen according to one embodiment.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

One method performs a first scan to detect an object proximate to a sense array. The first scan comprises a first sensitivity parameter. The method compares touch data from the first scan against multiple thresholds. The method performs a second scan to detect a touch event when the first scan's touch data exceeds a glove saturation threshold. The second scan comprising a second sensitivity parameter that is different than the first sensitivity parameter. The method reports a glove touch event when the first scan's touch data does not exceed the glove saturation threshold and exceeds the gloved-finger reporting threshold.

The embodiments described herein are directed to glove touch detection. A glove touch is considered a touch of a conductive object proximate to a touch sensitive device where the conductive object, such as a finger, is covered by a glove. A glove is a covering for hands. Gloves can be used by a person for protection or for warmth. Gloves, as used herein, should refer to gloves with individual fingers or mittens that cover more than one finger. Touches by gloved fingers may not have a definitive description, but the embodiments described herein can be configured to detect most available gloves. However, it is expected that some types of gloves, like boxing gloves, may not be detectable by some of the embodiments, but other types such as line thin wool gloves, leather gloves, thick wool gloves, thin ski gloves, padded leather gloves, or wool-lined mittens would be expected to be detectable.

Figure 1:
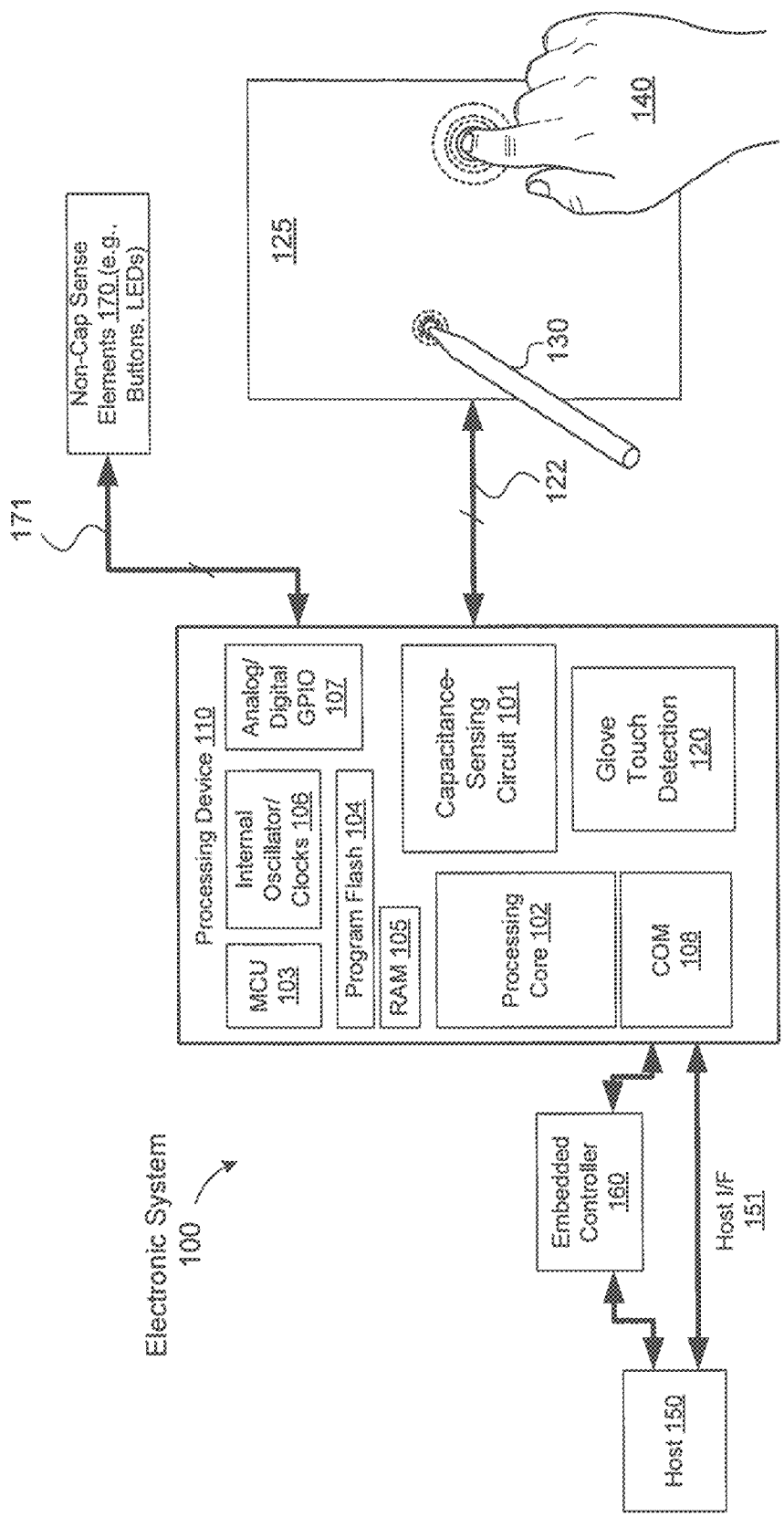
FIG. 1 is a block diagram illustrating one embodiment of an electronic system having a processing device including glove touch detection.

FIG. 1 is a block diagram illustrating one embodiment of an electronic system 100 having a processing device 110 including glove touch detection tool 120. Details regarding the glove touch detection tool 120 are described in more detail with respect to FIGS. 2-9. The processing device 110 is configured to detect one or more touches on a touch-sensing device, such as the capacitive sense array 125. The processing device can detect conductive objects, such as touch objects 140 (fingers or passive styluses), an active stylus 130, or any combination thereof. The capacitance-sensing circuit 101 can measure touch data on the capacitive sense array 125. The touch data may be represented as multiple cells, each cell representing an intersection of sense elements (e.g., electrodes) of the capacitive sense array 125. In another embodiment, the touch data is a 2D capacitive image of the capacitive sense array 125. In one embodiment, when the capacitance-sensing circuit 101 measures mutual capacitance of the touch-sensing device (e.g., capacitive sense array 125), the capacitance-sensing circuit 101 obtains a 2D capacitive image of the touch-sensing device and processes the data for peaks and positional information. In another embodiment, the processing device 110 is a microcontroller that obtains a capacitance touch signal data set, such as from a sense array, and finger detection firmware executing on the microcontroller identifies data set areas that indicate touches, detects and processes peaks, calculates the coordinates, or any combination therefore. The firmware identifies the peaks using the embodiments described herein. The firmware can calculate a precise coordinate for the resulting peaks. In one embodiment, the firmware can calculate the precise coordinates for the resulting peaks using a centroid algorithm, which calculates a centroid of the touch, the centroid being a center of mass of the touch. The centroid may be an X/Y coordinate of the touch. Alternatively, other coordinate interpolation algorithms may be used to determine the coordinates of the resulting peaks. The microcontroller can report the precise coordinates to a host processor, as well as other information.

A user wearing gloves cannot use a touchscreen device without removing their gloves. The glove touch detection tool 120 is used to allow a user to interact with a touch sensitive device without the need to remove gloves. Taking off and putting on gloves is time consuming and can be annoying. For time-critical responses, a user wearing gloves can miss important information; for example, responding to an incoming phone call. This glove touch detection tool 120 can be used to allow time-critical events to be met. For example, a user can respond to an incoming phone call on a touch screen of a mobile phone without removing their gloves to do so. Also, the glove touch detection tool 120 can be used to use other features of other types of devices than answering a call on a mobile phone. Conventional solutions to detect gloved touches used self-capacitance sensing and a glove filter to remove hovering events and approaching fingers. These conventional solutions resulted in frequent false detections (glove touch detected when it was just a non-gloved touch hovering) and could only be used for single finger detection, not multiple touches. Further, these conventional solutions had low accuracy and could not be used at the same time as finger or stylus detection.

The embodiments of the glove touch detection tool 120, as described herein, can allow time-critical responses without requiring the user to remove their gloves. For example, a user can answer, ignore or end a phone call on a touch-screen of the mobile phone. For another example, a user can dismiss alerts on a navigation system (or other types of devices). The glove touch detection tool 120 can function alongside finger touch detection and stylus detection. The glove touch detection tool 120 can auto-detect the input without help from a host device. The glove touch detection tool 120 can maintain the existing performance of the other input systems. For example, a finger touch performs equally well with and without the presence of a gloved touch detection. That is the accuracy of finger touch detection is not impacted by the glove touch detection tool 120. Also, there are no false touch detections when there is an approaching finger or hovering finger. Similarly, the stylus detection performs equally well with and without the presence of the glove touch detection tool 120. For example, the detection performance supports fast movement and tapping and the accuracy of stylus detection is equal to that of a finger. The glove touch detection tool 120 can be used to allow full use of a device with a touch sensitive input (e.g., touchscreen) while gloves are being worn. For example, the user can write a note or text message, add or edit a contact, select menus and enter data on a navigation or in-vehicle entertainment or information system, draw rudimentary pictures, and the like, without removing their gloves. The operations of glove touch detection tool 120 are described below with respect to FIGS. 2-9.

The glove touch detection tool 120 can be used in connection with other position detection and gesture recognition units. These units may obtain a capacitive image of a capacitive sense array 125. The capacitive image includes multiple cells each with a capacitance value of an intersection of sense elements of the sense array 125. Alternatively, these units can receives the raw capacitance value measured by the capacitive-sensing circuit 101 and then compute a difference count, which is a difference between the raw capacitance value and a baseline capacitance value. Alternatively, the capacitance-sensing circuit 101 outputs the difference count to the glove touch detection tool 120. The glove touch detection tool 120 can process the capacitive data received from the capacitance-sensing circuit 101 to determine if there is a gloved touch as described herein.

In one embodiment, the glove touch detection tool 120 is implemented in firmware of the processing device 110. In another embodiment, the glove touch detection tool 120 is implemented in software, hardware, or any combination thereof. In another embodiment, the glove touch detection tool 120 is implemented as part of a gesture recognition tool that calculates and reports gestures. In another embodiment, the glove touch detection tool 120 can be implemented on the host, and the capacitive-sensing circuit 101 obtains the touch data and sends the touch data to the glove touch detection tool 120 on the host processor 150. Alternatively, other configurations are possible as would be appreciated by one of ordinary skill in the art having the benefit of this disclosure. It should also be noted that the touches, gloved touches, stylus touches can be reported to various applications executing on the host processor 150.

Electronic system 100 includes processing device 110, capacitive sense array 125, stylus 130, host processor 150, embedded controller 160, and non-capacitive sense elements 170. The capacitive sense elements are electrodes of conductive material, such as copper. The sense elements may also be part of an ITO panel. The capacitive sense elements can be configurable to allow the capacitive-sensing circuit 101 to measure self capacitance, mutual capacitance, or any combination thereof. Self-capacitance scanning is a method of detecting the presence of a conductive object by measuring the relative capacitance to ground. For example, using self-capacitance scanning, every row and column is scanned individually resulting in R+C scans. Mutual-capacitance scanning is a method of detecting the presence of a conductive object by measuring the relative capacitance between two electrodes (transmit (TX) electrodes and receive (RX) electrodes). For example, using mutual-capacitance scanning, each intersection (TX/RX intersection) is scanned. However, in some cases, the RX electrodes can be grouped together, resulting in NumRXGroups*TX scans. In the depicted embodiment, the electronic system 100 includes the capacitive sense array 125 coupled to the processing device 110 via bus 122. The capacitive sense array 125 may include a multi-dimension capacitive sense array. The multi-dimension sense array includes multiple sense elements, organized as rows and columns. In another embodiment, the capacitive sense array 125 operates as an all-points-addressable ("APA") mutual capacitive sense array. In another embodiment, the capacitive sense array 125 operates as a coupled-charge receiver. In another embodiment, the capacitive sense array 125 is non-transparent capacitive sense array (e.g., PC touchpad). The capacitive sense array 125 may be disposed to have a flat surface profile. Alternatively, the capacitive sense array 125 may have non-flat surface profiles. Alternatively, other configurations of capacitive sense arrays may be used. For example, instead of vertical columns and horizontal rows, the capacitive sense array 125 may have a hexagon arrangement, or the like, as would be appreciated by one of ordinary skill in the art having the benefit of this disclosure. In one embodiment, the capacitive sense array 125 may be included in an ITO panel or a touch screen panel.

The operations and configurations of the processing device 110 and the capacitive sense array 125 for detecting and tracking the touch object 140 and stylus 130 are described herein. In short, the processing device 110 is configurable to detect a presence of the touch object 140, a presence of a stylus 130 on the capacitive sense array 125, or any combination thereof. The processing device 110 may detect and track the stylus 130 and the touch object 140 individually on the capacitive sense array 125. In one embodiment, the processing device 110 can detect and track both the stylus 130 and touch object 140 concurrently on the capacitive sense array 125. If the touching object is an active stylus, in one embodiment, the active stylus 130 is configurable to operate as the timing "master," and the processing device 110 adjusts the timing of the capacitive sense array 125 to match that of the active stylus 130 when the active stylus 130 is in use. In one embodiment, the capacitive sense array 125 capacitively couples with the active stylus 130, as opposed to conventional inductive stylus applications. It should also be noted that the same assembly used for the capacitive sense array 125, which is configurable to detect touch objects 140, is also used to detect and track a stylus 130 without an additional PCB layer for inductively tracking the active stylus 130.

In the depicted embodiment, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configurable to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 102 to implement operations described herein). Processing device 110 may also include a memory controller unit ("MCU") 103 coupled to memory and the processing core 102. The processing core 102 is a processing element configured to execute instructions or perform operations. The processing device 110 may include other processing elements as would be appreciated by one of ordinary skill in the art having the benefit of this disclosure. It should also be noted that the memory may be internal to the processing device or external to it. In the case of the memory being internal, the memory may be coupled to a processing element, such as the processing core 102. In the case of the memory being external to the processing device, the processing device is coupled to the other device in which the memory resides as would be appreciated by one of ordinary skill in the art having the benefit of this disclosure.

The processing device 110 may also include an analog block array (not shown). The analog block array is also coupled to the system bus. Analog block array may also be configurable to implement a variety of analog circuits (e.g., ADCs or analog filters) using, in one embodiment, configurable UMs. The analog block array may also be coupled to the GPIO 107.

As illustrated, capacitance-sensing circuit 101 may be integrated into processing device 110. Capacitance-sensing circuit 101 may include analog I/O for coupling to an external component, such as touch-sensor pad (not shown), capacitive sense array 125, touch-sensor slider (not shown), touch-sensor buttons (not shown), and/or other devices. The capacitance-sensing circuit 101 may be configurable to measure capacitance using mutual-capacitance sensing techniques, self-capacitance sensing technique, charge coupling techniques or the like. In one embodiment, capacitance-sensing circuit 101 operates using a charge accumulation circuit, a capacitance modulation circuit, or other capacitance sensing methods known by those skilled in the art. In an embodiment, the capacitance-sensing circuit 101 is of the Cypress TMA-3xx, TMA-4xx, or TMA-xx families of touch screen controllers. Alternatively, other capacitance-sensing circuits may be used. The mutual capacitive sense arrays, or touch screens, as described herein, may include a transparent, conductive sense array disposed on, in, or under either a visual display itself (e.g. LCD monitor), or a transparent substrate in front of the display. In an embodiment, the TX and RX electrodes are configured in rows and columns, respectively. It should be noted that the rows and columns of electrodes can be configured as TX or RX electrodes by the capacitance-sensing circuit 101 in any chosen combination. In one embodiment, the TX and RX electrodes of the sense array 125 are configurable to operate as a TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of a RX electrode and a TX electrode (a sense element) as done during mutual-capacitance sensing. An intersection between two sense elements may be understood as a location at which one sense electrode crosses over or overlaps another, while maintaining galvanic isolation from each other. The capacitance-sensing circuit 101 does not use mutual-capacitance or self-capacitance sensing to measure capacitances of the sense elements when performing a stylus sensing. Rather, the capacitance-sensing circuit 101 measures a charge that is capacitively coupled between the sense array 125 and the stylus as described herein. The capacitance associated with the intersection between a TX electrode and an RX electrode can be sensed by selecting every available combination of TX electrode and RX electrode. When a touch object, such as a finger, gloved finger or stylus, approaches the capacitive sense array 125, the object causes a decrease in mutual capacitance between some of the TX/RX electrodes. In another embodiment, the presence of a finger increases the coupling capacitance of the electrodes. Thus, the location of the finger on the capacitive sense array 125 can be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more inputs can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of coordinate interpolation algorithms may be used to detect the center of the touch as would be appreciated by one of ordinary skill in the art having the benefit of this disclosure.

In an embodiment, the electronic system 100 may also include non-capacitive sense elements 170 coupled to the processing device 110 via bus 171 and GPIO port 107. The non-capacitive sense elements 170 may include buttons, light emitting diodes ("LEDs"), and other user interface devices, such as a mouse, a keyboard, or other functional keys that do not use capacitance sensing. In one embodiment, buses 122, and 171 are embodied in a single bus. Alternatively, these buses may be configured into any combination of one or more separate buses.

Processing device 110 may include internal oscillator/clocks 106 and communication block ("COM") 108. In another embodiment, the processing device 110 includes a spread spectrum clock (not shown). The oscillator/clocks block 106 provides clock signals to one or more of the components of processing device 110. Communication block 108 may be used to communicate with an external component, such as a host processor 150, via host interface ("I/F") line 151. Alternatively, processing device 110 may also be coupled to embedded controller 160 to communicate with the external components, such as host processor 150. In one embodiment, the processing device 110 is configurable to communicate with the embedded controller 160 or the host processor 150 to send and/or receive data.

Processing device 110 may reside on a common carrier substrate such as, for example, an integrated circuit ("IC") die substrate, a multi-chip module substrate, or the like. Alternatively, the components of processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 110 may also be done in the host.

Capacitance-sensing circuit 101 may be integrated into the IC of the processing device 110, or alternatively, in a separate IC. Alternatively, descriptions of capacitance-sensing circuit 101 may be generated and compiled for incorporation into other integrated circuits. For example, behavioral level code describing the capacitance-sensing circuit 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 101.

It should be noted that the components of electronic system 100 may include all the components described above. Alternatively, electronic system 100 may include some of the components described above.

In one embodiment, the electronic system 100 is used in a tablet computer. Alternatively, the electronic device may be used in other applications, such as a notebook computer, a mobile handset, a personal data assistant ("PDA"), a keyboard, a television, a remote control, a monitor, a hand-held multi-media device, a handheld media (audio and/or video) player, a handheld gaming device, a signature input device for point of sale transactions, an eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition, and numeric keypad operation.

Figure 2:
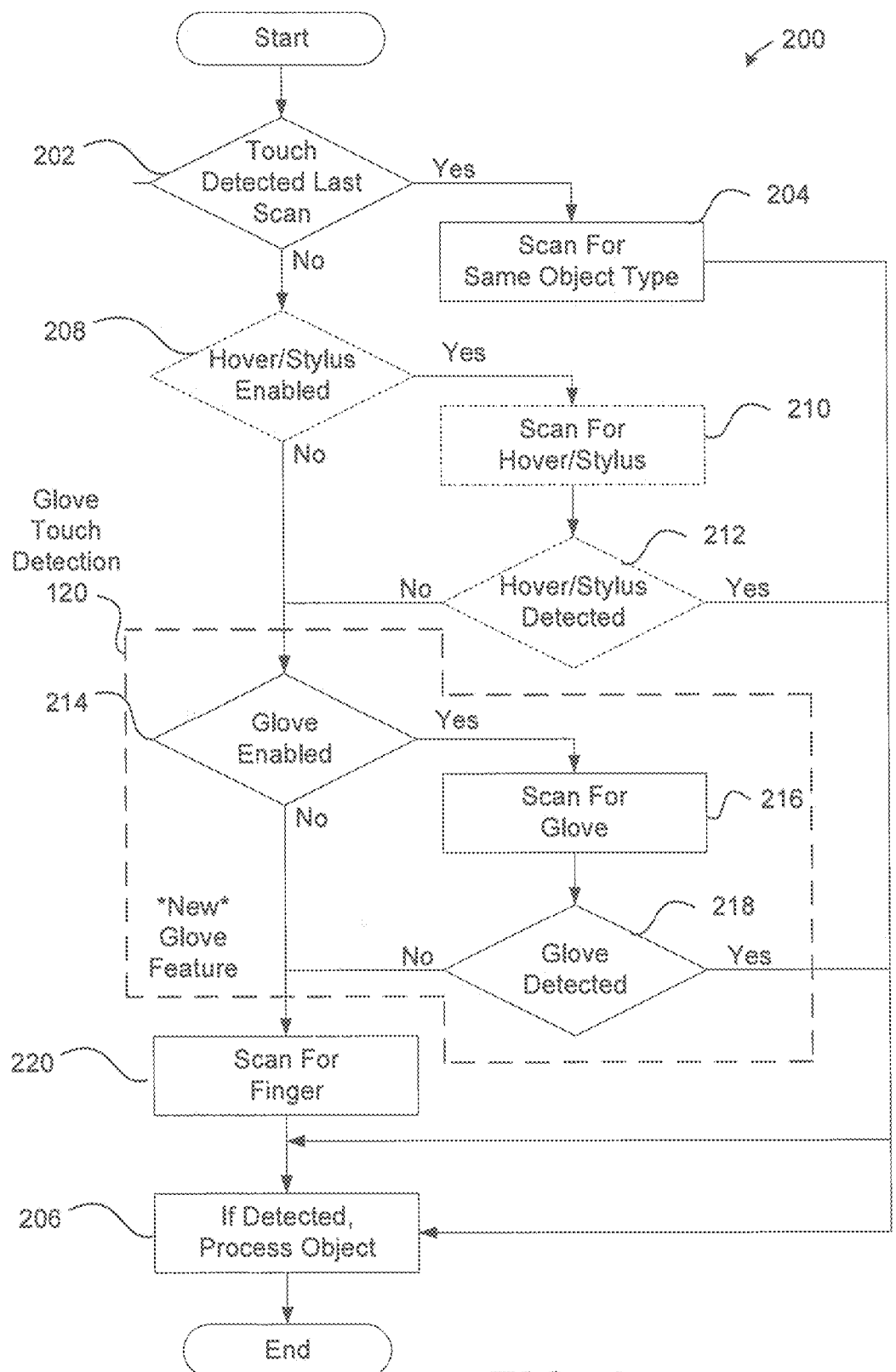
FIG. 2 is a flow diagram of a method of glove touch detection according to one embodiment.

FIG. 2 is a flow diagram of a method 200 of glove touch detection according to one embodiment. The method 200 may be performed by processing logic that may comprise hardware (circuitry, dedicated logic, etc.), software (such as is run on a general purpose computing system or a dedicated machine), firmware (embedded software), or any combination thereof. In one embodiment, the processing device 110 performs the method 200. In another embodiment, the glove touch detection tool 120 performs the method 200. Alternatively, other components of the electronic system 100 perform some or all of the operations of method 200.

Referring to FIG. 2, the method 200 begins with processing logic determining if a touch was detected on a last scan (block 202). If there was a touch detected on the last scan, the processing logic scans for the same object type (block 204) and if detected processes the object (block 206) and the method 200 ends. However, if there was not a touch detected on the last scan at block 202, the processing logic optionally determines if hover mode or stylus mode, or both, are enabled (block 208). If these modes are enabled, the processing logic scans for hover events, stylus events, or both (block 210) and determines if a hover object or a stylus object is detected (block 212). If the hover object, stylus object, or both are detected at block 212, the processing logic processes the touch object at block 206 and the method 200 ends. However, if the hover object, stylus object, or both are not detected at block 212, the processing logic proceeds with glove touch detection. For glove touch detection, the processing logic determines if the glove touch detection (e.g., 120) is enabled (block 214). If enabled, the processing logic scans for glove touches (block 216) and determines if glove touches are detected (block 218). If the glove touch is detected at block 218, the processing logic proceeds to process the touch object at block 206 and the method 200 ends. However, if the glove touch is not detected at block 218, the processing logic scans for finger touches (block 220). When the processing logic determines that a finger touch is detected, the processing logic processes the touch object at block 206 and the method 200 ends. The method 200 can be repeated to track glove touches and finger touches, as well as optionally track hover touches or stylus touches.

In one embodiment, the processing logic can detect these different types of events according to a detection hierarchy. In one embodiment, the processing device may already have a detection hierarchy with both hover detection and stylus detection. The glove detection hierarchy can be implemented as another level in the existing hierarchy. In one embodiment, the detection hierarchy is implemented by first scanning for an object with a lowest expected signal. If that object is detected, scanning stops and the object is reported. If the object is not detected because of low signal, scanning stops. If the object is not detected due to excessive signal, then the next scan is for the object with the next lowest expected signal and so on. For example, the order of objects with the smallest to largest expected signals may be 1) Stylus or Hover detection using advanced scanning methods; 2) Glove detection using a sensitive mutual-capacitance scan; and 3) finger detection using a standard mutual-capacitance scan. If an object is detected, scanning for other objects stops until the current object is no longer detected. An object may be "not detected" if its signal strength drops below a specific (tuned) threshold. However, low signal objects (hover, stylus, and glove) can also be "not detected" if the signal strength increases above a specific (tuned) saturation threshold as described herein.

The following table illustrates one current scanning hierarchy without glove detection.

| Currently Detected Object | Feature Enabled | $1^{st}$ Scan | $2^{nd}$ Scan |
|---|---|---|---|
| No touch detected | None | Finger | — |
|  | Stylus/Hover | Stylus/Hover | Finger |
| Stylus/Hover detected | Stylus/Hover | Stylus/Hover | — |
| Finger detected | None | Finger | — |
|  | Stylus/Hover | Finger | — |

The following table illustrates another scanning hierarchy with glove detection enabled.

| Currently Detected Object | Feature Enabled | $1^{st}$ Scan | $2^{nd}$ Scan | $3^{rd}$ Scan |
|---|---|---|---|---|
| No touch detected | None | Finger | — | — |
|  | Stylus/Hover | Stylus/Hover | Finger | — |
|  | Glove | Glove | Finger | — |
|  | Stylus/Hover and Glove | Stylus/Hover | Glove | Finger |
| Stylus/Hover detected | Stylus/Hover | Stylus/Hover | — | — |
|  | Stylus/Hover and Glove | Stylus/Hover | — | — |
| Glove | Glove | Glove | — | — |
|  | Stylus/Hover and Glove | Glove | — | — |
| Finger detected | None | Finger | — | — |
|  | Stylus/Hover | Finger | — | — |
|  | Glove | Finger | — | — |
|  | Stylus/Hover and Glove | Finger | — | — |

In one embodiment at blocks 204, 210, 216 or 220, the processing logic collects a capacitive image of measured values. The capacitive image may include multiple cell values representing the capacitances of the intersections of a capacitive sense array. In one embodiment, the processing logic calculates the difference counts, which are the differences between the raw counts of the intersections and the baselines of the intersections. In another embodiment, the processing logic receives the difference counts from a different circuit or routine executing on the processing device.

In a further embodiment, the sense array is a capacitive sense array, and each of the multiple cells includes a capacitance value of an intersection of sense elements in the capacitive sense array. In another embodiment, the sense array is an optical sense array, and the cell values represent the values measured by an optical sensing device. Alternatively, the glove touch detection embodiments described herein may be used in other sensing systems, such as, for example, a system that creates a digitized heat map using reflected light.

The methods described above regarding glove touch detection can be implemented by the glove touch detection tool 120, which may be implemented in a capacitive touch screen controller. In one embodiment, the capacitive touch screen controller is one of the TrueTouch® capacitive touchscreen controllers, such as the CY8CTMA3xx family of TrueTouch® Multi-Touch All-Points touchscreen controllers, developed by Cypress Semiconductor Corporation of San Jose, Calif. The TrueTouch® capacitive touchscreen controller sensing technology to resolve touch locations of multiple fingers and a stylus on the touch-screens, supports leading operating systems, and is optimized for low-power multi-touch gesture and all-point touchscreen functionality. Alternatively, the touch position calculation features and glove touch position calculation features may be implemented in other touchscreen controllers, or other touch controllers of touch-sensing devices. In one embodiment, the touch position calculation features and glove touch position calculation features may be implemented with other touch filtering algorithms as would be appreciated by one of ordinary skill in the art having the benefit of this disclosure.

The embodiments described herein may be used in various designs of mutual-capacitance sensing arrays of the capacitance sensing system, or in self-capacitance sensing arrays. In one embodiment, the capacitance sensing system detects multiple sense elements that are activated in the array, and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

In another embodiment, the processing logic performs a first scan to detect an object proximate to a sense array. The object may be a hover type object, a stylus type object, a glove type object or a finger type object. The first scan uses a first sensitivity parameter. The processing logic compares touch data from the first scan against multiple thresholds. The processing logic performs a second scan to detect a touch event when the first scan's touch data exceeds a glove saturation threshold. The glove saturation threshold can be considered a saturation threshold of the first scan for low signal touch objects, such as hover, stylus or glove touches. The second scan uses a second sensitivity parameter that is different than the first sensitivity parameter. The sensitivity parameter may be one or more parameters that may be thresholds, scan configuration parameters, or the like. The processing logic reports a glove touch event when the first scan's touch data does not exceed the glove saturation threshold and exceeds a the gloved-finger reporting threshold. Examples of the thresholds are illustrated and described with respect to FIG. 4B.

In a further embodiment, the processing logic reports no-touch event when the first scan's touch data does not exceed gloved-finger reporting threshold. Alternatively, post-processing can be used to identify the object profile as not a glove touch. For example, pressure indicators or acceleration indicators or other hysteresis data can be used to distinguish between touch types.

In one embodiment, the first scan is a mutual-capacitance scan in a mutual-capacitance mode. In another embodiment, the first scan is a mutual-capacitance scan in a mixed mode that includes a mutual-capacitance scan and a self-capacitance scan. The mutual-capacitance scan can be used for accuracy of the positions of the glove touch, where the self-capacitance scan can be used to determine a distance metric, as described herein.

In a further embodiment, the processing logic performs a higher sensitivity scan before the glove detection scan to detect at least one of a hover event or a stylus event by the object. For example, the processing logic can scan for the same object type if a touch was detected in the last scan. The touch here could be a glove touch, a hover touch, a stylus touch, or a finger touch. The processing logic can continue detecting the same object type until the same object type is no longer detected. This may be according to the scanning hierarchy described herein.

In a further embodiment, the processing logic performs a third scan after the second scan to detect the object proximate to the sense array. The third scan uses scan parameters and threshold parameters resulting in a less sensitive scan. This may be according to the scanning hierarchy described herein.

In one embodiment, the processing logic reports the glove touch event when the first scan's touch data does not exceed the glove saturation threshold, exceeds an initial detection threshold and exceeds the gloved-finger reporting threshold. Hysteresis is involved in the glove touch detection and finger detection as described below with respect to FIG. 9. The glove saturation threshold can operate as a maximum threshold for gloved touches and the gloved-finger reporting threshold can operate as a minimum threshold for gloved touches.

In some embodiments, the processing logic detects more than one touch object during the first scan. The processing logic can perform multi-touch scanning using mutual-capacitance scans as described herein.

In another embodiment, the processing logic scans for at least one of a hover type object or a stylus type object proximate to a sense array by a touch controller in a first scan. The processing logic scans for a glove type object proximate to the sense array by the touch controller in a second scan. The second scan provides a more sensitive scan than the first scan by using one or more of: a different scan method, different scan parameters, and different thresholds. The processing logic scans for a finger type object proximate to the sense array by the touch controller in a third scan. The third scan provides a more sensitive scan than the second scan by using one or more of: a different scan method, different scan parameters, and different thresholds.

In a further embodiment, the processing logic determines an object type from a previous scan. The object type is at least one of the hover type object, stylus type object, glove type object, or finger type object. The previous scan may be at least one of the first scan, second scan, or third scan. The processing logic scans for an object of a same object type in one or more subsequent scans until the object of the same object type is no longer detected.

In other embodiments, the processing logic detects multiple touches during any of the multiple scans.

In a further embodiment, the processing logic detects the glove type object in the second scan and activates a function of a device in which the touch controller resides, in response to the detecting the glove type object in the second scan. In one embodiment, the glove type object is detected by comparing touch data on the sense array against multiple thresholds. The processing logic determines that the first scan's touch data exceeds the gloved-finger reporting threshold and does not exceed the glove saturation threshold to detect the glove type object.

In one embodiment, the processing logic performs a mutual-capacitance scan in a mutual-capacitance mode in the second scan. In another embodiment, the processing logic performs a mutual-capacitance scan and a self-capacitance scan in a mixed mode in the second scan.

In another embodiment, the processing logic receives a pressure indicator from a pressure sensor disposed in relation to the sense array. The processing logic determines a presence of at least one of the hover type object, stylus type object, glove type object, or finger type object when the pressure indicator exceeds or does not exceed a pressure threshold.

In another embodiment, the processing logic receives an acceleration indicator from an accelerometer disposed in relation to the sense array. The processing logic determines a presence of at least one of the hover type object, stylus type object, glove type object, or finger type object when the acceleration indicator exceeds or does not exceed an acceleration threshold.

In another embodiment of the method, the processing logic measures a first set of touch data on a sense array. The processing logic determines that the touch data represents one or more touches proximate to the sense array. In one embodiment, the sense array is a capacitive sense array. Each of the cells of the capacitive sense array includes a capacitance value of an intersection of sense elements in the capacitive sense array. In a further embodiment, the first set of touch data is represented as multiple cells that each correspond to the intersections of the capacitive sense array. In a further embodiment, at least two of the two or more touches overlap on at least one of the intersections. In another embodiment of the method, the processing logic obtains a capacitive image of a capacitive sense array. The capacitive image includes multiple cells each with a capacitance value of an intersection of sense elements of the capacitive sense array. The processing logic identifies one or more touches proximate to the capacitive sense array based on the capacitive image.

The embodiments described above are discussed in scenarios where there are two touches detected on the sense array, however, the embodiments may also be used in scenarios where there is one touch, as well as three or more touches. Also, the scanning techniques may be used when the two or more touches are close together, such as when at least two touches overlap at least one sense element, as well as when the two or more touches are farther apart. Also, the embodiments described herein can be used when one or more touches are at the edge of the sensor array. For example, a partial touch may be detected at the edge of the sense array and the scanning techniques described herein can be used to determine the touch positions and the like.

In another embodiment, glove touch detection can be implemented as a device mode for a touchscreen controller, such as a touchscreen controller that already supports hover and stylus modes as described herein. In one embodiment, these modes can be enabled at blocks 208 and 214 using a system information mode field. The glove touch detection feature may be enabled or disabled independently of both the stylus detection feature and the hover detection feature. It should be noted that in some embodiments, the stylus mode described here is the high-accuracy stylus mode. The low-accuracy stylus detection that is part of the glove feature cannot be enabled or disabled independently of the glove feature at this time. The ability to independently configure the low-accuracy stylus detection is not precluded by this feature, and may be implemented together in other embodiments.

Figure 3:
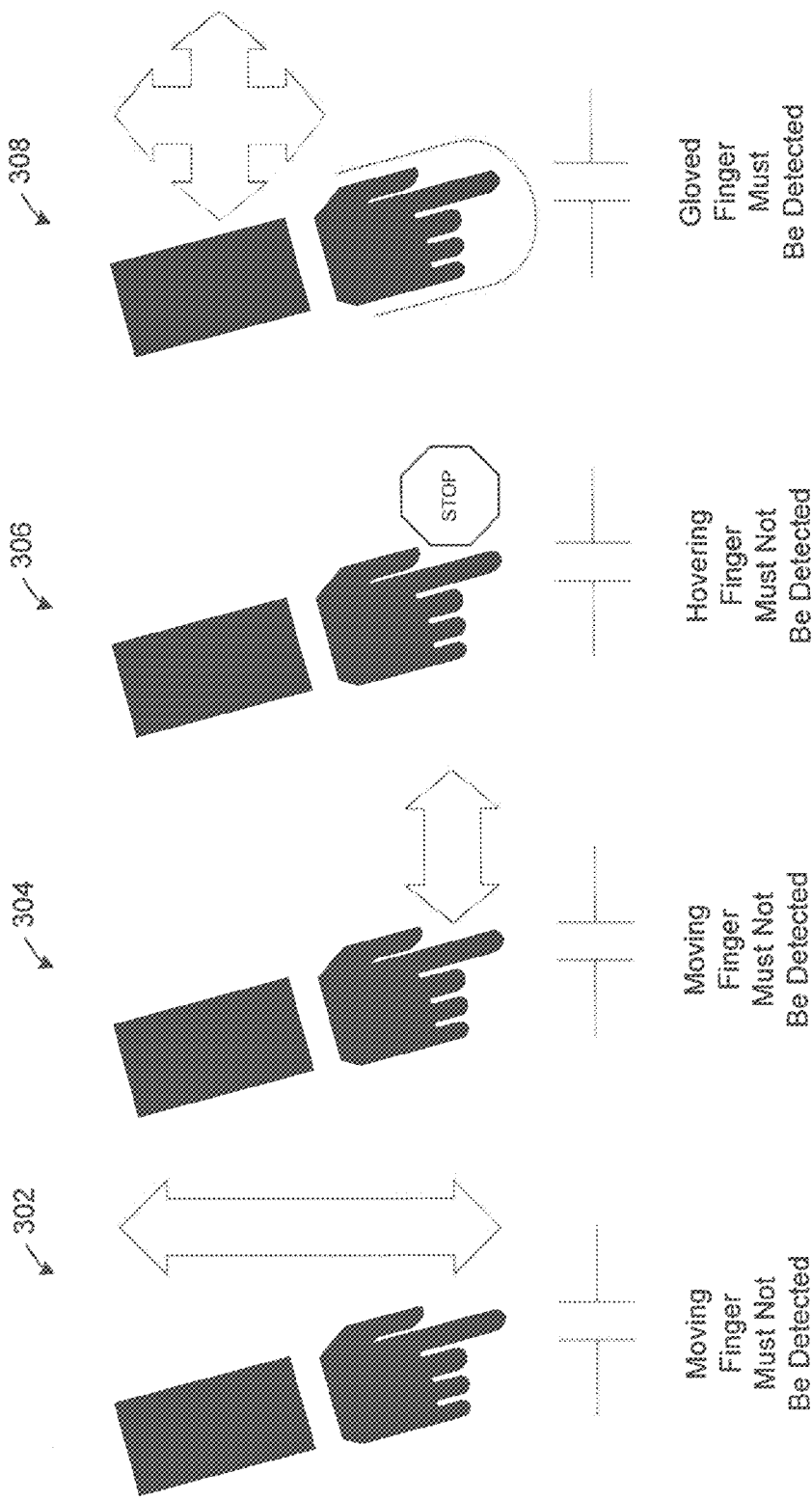
FIG. 3 illustrates four finger events including a gloved finger event detectable by the processing device of FIG. 1 according to one embodiment.

It should also be noted that, for the low signal objects such as hover type objects, stylus type objects and glove type objects (as contrasted with high signal objects such as finger type objects), an object's detection can fail if the signal detected is too large as well as too small as described and illustrated with respect to FIGS. 3, 4A, 4B.

FIG. 3 illustrates four finger events including a gloved finger event detectable by the processing device of FIG. 1 according to one embodiment. The finger event 302 is when a finger is approaching or departing from the sense array. The finger event 304 is when a finger is detected proximate to the sense array and when the detected finger is moving parallel to, but not in contact with, a touch surface. The finger event 306 is when a finger is hovering above the sense array. The sensitivity of the sense array can detect a presence of a finger that is not touching the touch surface. A hover touch is when a finger is not actually touching the touch surface but is still detectable by the sense array. The finger event 308 is when a gloved finger is detected. That is the finger is covered by a glove. The gloved finger can also be detected moving along the touch surface. The embodiments of the glove touch detection do not report the finger events 302, 304 and 306. That is a glove touch is not reported when a finger is approaching or departing from the sense array (represented as a capacitor) as illustrated in the finger event 302. A glove touch is not reported when a finger is moving parallel to, but not in contact with, the touch surface as illustrated in the finger event 304. A glove touch is not reported when a finger is hovering as illustrated in the finger event 306. A glove touch is reported when a gloved finger is on the touch surface (e.g., touch surface of a touchscreen). It should be noted that a false detection is far less acceptable than not detecting a real gloved touch. The finger events 302, 304, 306 and 308 can be detected in a first scan. The first scan may be a sensitive scan that precedes a second scan. The first scan may use a first sensitivity parameter that is more sensitive than a second sensitivity parameter of the second scan. The first scan may be considered a sensitive scan and the second scan may be considered a standard scan. The first scan can be used to detect a glove touch, whereas the second scan can be used to detect a finger touch. The first sensitivity parameter can be used to make the sense array more sensitive to touch objects that may be a greater distance from the touch surface. The first sensitivity parameter of the first scan can be used to detect a low signal object, such as the glove touch, and the second sensitivity parameter of the second scan can be used to detect a high signal object, such as a finger touch.

FIG. 4A illustrates detection and reporting thresholds during a standard scan 400 of a touchscreen 410 according to one implementation. During the standard scan 400, the touchscreen controller is configured such that a finger 402 is only reported after the detected signal passes a configurable threshold, called a finger reporting threshold 430. The touchscreen controller is able to detect an object's presence at much further distance (i.e., initial detection threshold 420) than the reporting distance (i.e., finger reporting threshold 430). The finger reporting threshold 430 is usually configured to represent when a small finger makes a light touch on the touchscreen 410 as illustrated in FIG. 4A. The touchscreen controller can also be configured such that a finger 402 can be detected after the detected signal passes an initial detection threshold 420; but, the finger 402 is reported after the detected signal passes the finger reporting threshold 430. These two thresholds of the standard scan 400 can be set during a tuning phase. These thresholds may be programmable before runtime such as when compiled or during run-time.

FIG. 4B illustrates a detection threshold, a gloved-finger reporting threshold and a glove saturation threshold in a sensitive scan 450 of a touchscreen according to one embodiment. During the sensitive scan 450, the touchscreen controller is configured such that a gloved finger 452, which is a finger covered by a glove 454, is only reported after the detected signal passes a first configurable threshold, called a gloved-finger reporting threshold 470, but does not pass a second configurable threshold, called a glove saturation threshold 480. The glove saturation threshold 480 represents when the touch object is a finger touch. The glove saturation threshold 480 is where the signal detected is too large to provide good data to calculate a location of a gloved touch. Therefore, at the saturation level, the scanning method can change to the standard mutual-capacitance scan. For example, when the detected signal passes the glove saturation threshold 480, a standard scan can be performed to detect the finger touch as illustrated in FIG. 4A. The touchscreen controller is able to detect a gloved finger's 452 presence at much further distance (i.e., initial detection threshold 460) than the reporting distance (i.e., gloved-finger reporting threshold 470). The gloved-finger reporting threshold 470 can be set to represent when a gloved finger is proximate to the touchscreen 410. That is the glove 454 may be touching the touchscreen 410, but the finger within the glove 454 is not touching the touchscreen 410 because of the glove 454 as illustrated in FIG. 4B. Like above, the touchscreen controller can also be configured such that a gloved finger 452 can be detected after the detected signal passes an initial detection threshold 460; but, the gloved finger 452 is reported after the detected signal passes the gloved-finger reporting threshold 470. These three thresholds of the sensitive scan 450 can be set during a tuning phase. These thresholds may be programmable before run-time such as when compiled or during run-time. In one embodiment, the sensitive mutual-capacitance saturation threshold 480 is set to be when the finger is closer to the touchscreen 410 than where the mutual-capacitance finger reporting threshold 430 is set in order to provide a smooth transition; this provides some hysteresis between the two distances.

The standard scan 400 and the sensitive scan 450 are mutual capacitive scans. In another embodiments, the sensitive scan 450 can include a mutual capacitive scan and a self-capacitive scan as described herein.

FIG. 4B also shows three typical scenarios of objects that may be detected by the sensitive scan 450. The gloved finger 452 is one scenario described above. During the sensitive scan 450, the touchscreen controller can detect a finger 462 approaching the touchscreen 410 and a finger 472 hovering above the touchscreen 410. As described above, a touch should not be reported when a finger 462 is approaching or when a finger 472 hovering, and should report when a gloved finger 452 is on the touchscreen 410. The non-reported events 462, 472 are distinguished from the reported event 452 by one or more hardware and software algorithms.

As described above, the touchscreen controller can be configured at both compile and run-time with configuration parameters. The configuration parameters may include the following: 1) The sensitive scan 450 can include the standard scan's 400 tuning parameters, such as prescaler, TX cycles, sub-conversions, baseline configuration, reporting threshold, etc.; 2) Sensitive mutual-capacitance saturation threshold 480, and the sensitive mutual-capacitance reporting threshold 470; 3) Glove feature enabled at startup.

In some embodiments, the glove touch detection can use scanning data accumulation as described below in a high-level post-processing algorithm. The post-processing algorithm allows detecting a gloved finger operation without any changes in the scanning procedure by means of using the scanning data accumulation. The post-processing algorithm can be used after a centroid calculation that determines an approximate coordinate of a center of an object proximate to the sense array. In one implementation, at least three gloved finger touches can be detected using 256 bytes of memory (e.g., RAM).

When using gloved fingers to operate a touchscreen, there is signal deterioration in the mutual-capacitance scanning results, as compared to when using non-gloved fingers. This is because the surface of the finger is remote from the sense array at least the glove's material thickness. This may be equivalent to increasing an overlay thickness disposed to cover the sense array by the material thickness. As a result, during a gloved finger operation, the algorithm for finding local maximums cannot detect any local maximums, because they are lower than the FingerTheshold value (e.g., finger reporting threshold 430). The difference data examples for gloved fingers 552 and ungloved fingers 502 are shown in FIGS. 5A and 5B.

Figure 5A:
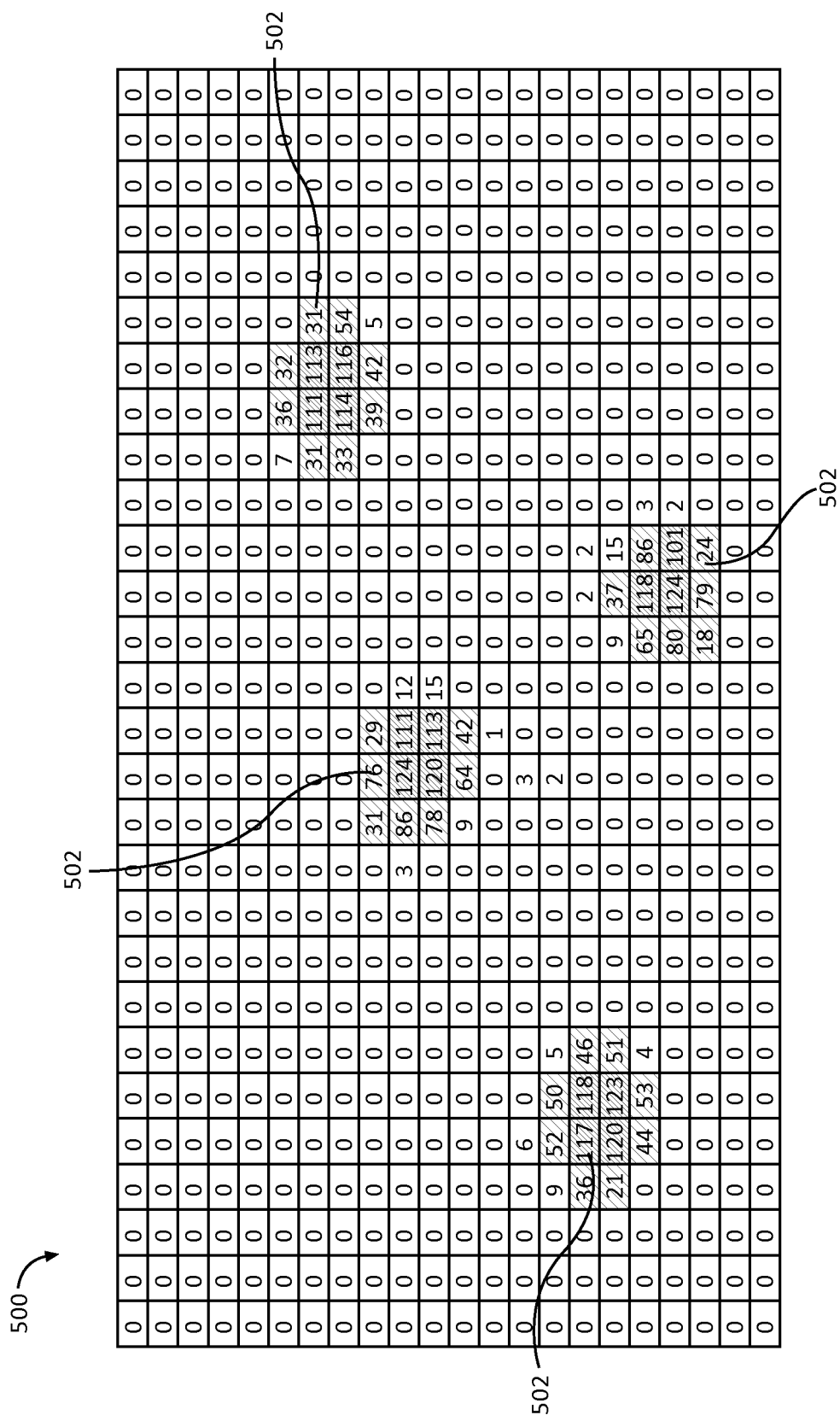
FIG. 5A illustrates a visual representation of difference data of a mutual-capacitance scan of a touchscreen representing four ungloved fingers according to one embodiment.
Figure 5B:
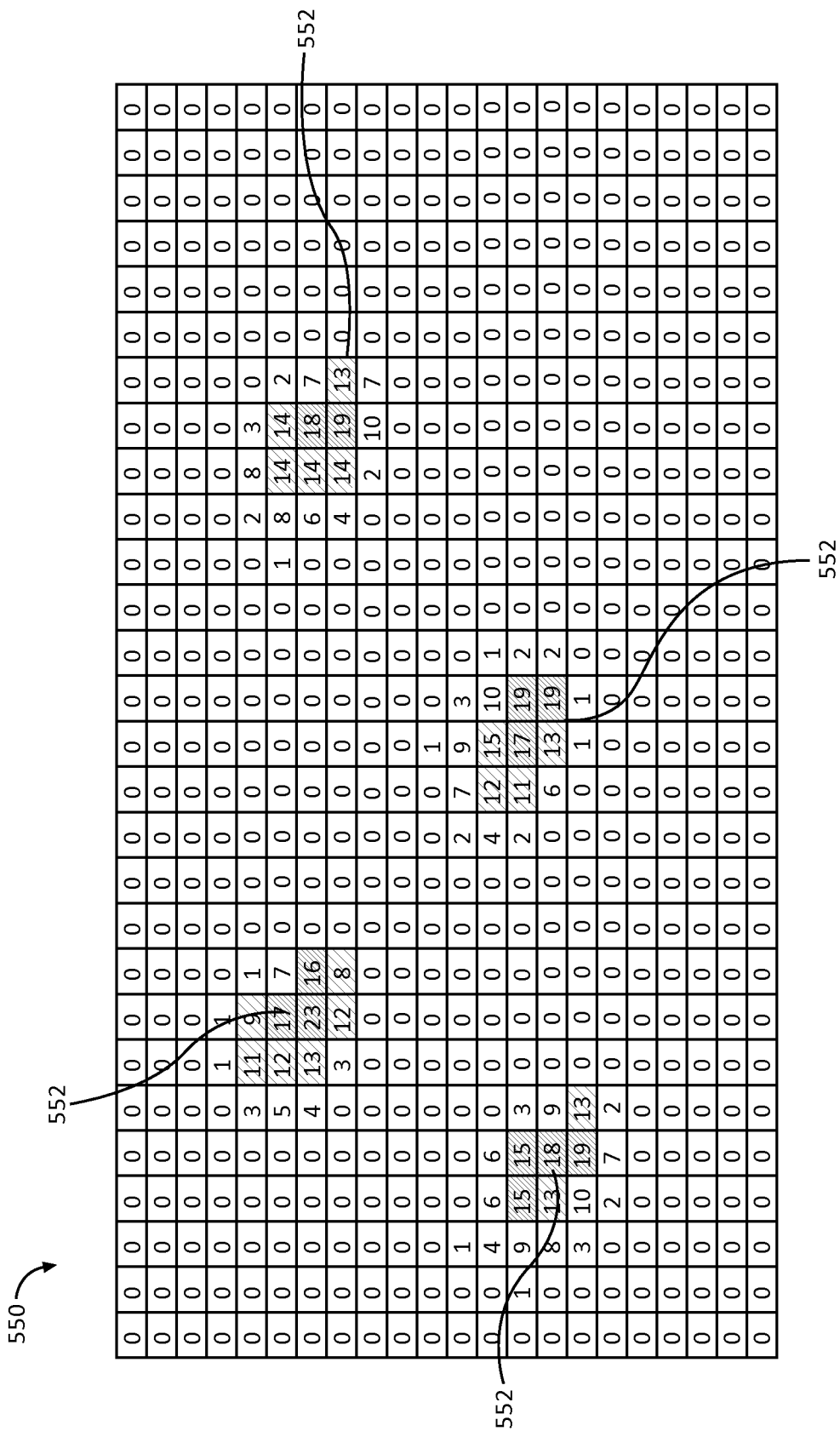
FIG. 5B illustrates a visual representation of difference data of a mutual-capacitance scan of a touchscreen representing four gloved fingers according to one embodiment.

FIG. 5A illustrates a visual representation of difference data 500 of a mutual-capacitance scan of a touchscreen representing four ungloved fingers 502 according to one embodiment. FIG. 5B illustrates a visual representation of difference data 550 of a mutual-capacitance scan of a touchscreen representing four gloved fingers 552 according to one embodiment. As described above, the gloved fingers 552 are not detected as touches as their difference data does not exceed the finger reporting threshold. Using the glove touch detection embodiments described herein, the gloved fingers 552 can be detected as glove touch events. As a result, operations can be performed on the touchscreen without the user removing the glove to interact with the touchscreen.

The glove touch detection embodiments, by way of the sensitive scan, separate any low reaction of the measuring channels from continual in time gloved finger operations and short-time unstable reactions, such as those resulting from external noise reactions. At the same time, the ungloved finger operation characteristics stay the same as measured in standard scans.

As the base for gloved finger operation detection, the touchscreen controller can use the difference values after the baseline calculation. It can be D matrix of the difference values for all intersections of a sense array, such as sensors of $N_{rows}*M_{columns}$ sensors panel. One way the touchscreen controller detects a gloved finger touch is to amplify the processing signal D to reach the FingerTheshold processing level. We can calculate an extra sensitive Dg gloved finger differences matrix as in the following equation (1):

$$Dg=G*D, \qquad (1)$$

where G is gain. In this case, the touchscreen controller receives the noises multiplied by G too. It may be better to use the running sum of G last scanning frames of D matrix to calculate Dg as in the following equation (2):

$$Dg_i = \sum_{j=0}^{G-1} D_{i-j} \qquad (2)$$

In this case, the touchscreen controller can obtain the same multiplying factor G for the signal, but with lower noise dependence. To collect all necessary data for Dg calculation, the touchscreen controller uses N*N*G words of the memory. The touchscreen controller can also change the FIR signal filtration in equation (2) for IIR filtration to reduce the used memory size as in the following equation (3):

$$Dg_i=\alpha*Dg_{i-1}+(1-\alpha)*(G*D_i), \ 1>\alpha>0.5, \qquad (3)$$

where α is the filter time constant. To calculate the current $Dg_i$ matrix, the touchscreen controller needs the previous scanning frame $Dg_{i-1}$ matrix and current $D_i$ matrix. The choice of G and α values may depend on the glove's material thickness, SNR of the signal, and operating stability expectation. The equation (3) with a fixed data point can be written as in the following equation (4):

$$Dg_i = \frac{\alpha * Dg_{i-1} + (A - \alpha) * (G * D_i)}{A}. \quad (4)$$

where $A=2^n$, $2^{n-1}<\alpha<2^n$. Hence, the touchscreen control can use a traditional algorithm for finding local maximums and centroid algorithms for Dg matrix, then gloved finger touches can be detected. Therefore, the touchscreen controller can calculate Dg matrix and try to detect any gloved finger touches if a normal finger activity is not present.

In one embodiment, to control switching between normal mode operations (e.g., standard scanning) and glove mode operations, a state machine can be used to transition between the modes. Timeouts can be used to switch between the modes. These timeout values can be tunable as configurable parameters. An example of one state machine is illustrated and described with respect to FIG. 6.

Figure 6:
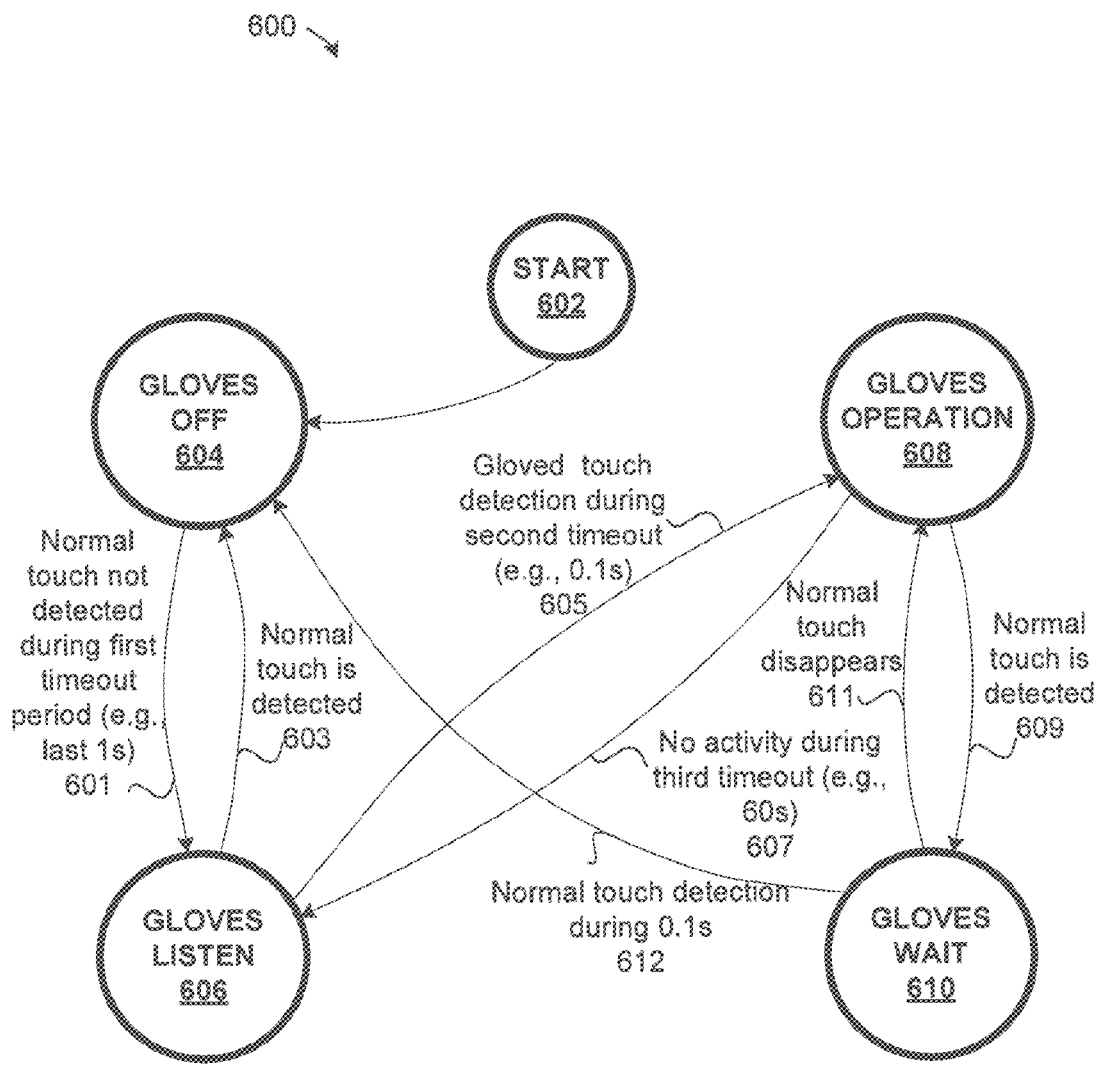
FIG. 6 is a state machine to control touch detection according to another embodiment.

FIG. 6 is a state machine 600 to control touch detection according to another embodiment. The state machine 600 starts at state 602 and moves into "gloves off" state 604. At gloves off state 604, the touchscreen controller operates in a normal scanning mode. In "gloves off" state 604, the gloved finger detection procedure does not work and Dg matrix is not calculated. During this state, if there is no normal finger touch detected within a first timeout period 601, the state machine 600 transitions to the "gloves listen" state 606. For example, if there is no activity on the sense array during 1 second, the first timeout period, the state switches to the "gloves listen" state 606. During the "gloves listen" state 606, the touchscreen controller uses the gloved finger detection procedures and calculates the Dg matrix. In this state 606, the touchscreen controller does not report gloved touches if they are detected, but switches to the "gloves off" state 604 if a normal touch appears 603 in the "gloves listen" state 606. The normal touch can be reported immediately. If at state 606, if one or more gloved touches are present continuously during a second timeout period 605 (e.g., 0.1 seconds), the state switches to "gloves operation" state 608.

In the "gloves operation" state 608, the touchscreen controller utilizes the gloved finger detection procedures and calculates the Dg matrix. The touchscreen controller reports gloved touches if they are detected. The state switches to "gloves wait" state 610 if a normal touch appears 609 or to "gloves listen" state 606 if no activity is present during a third timeout 607 (e.g., 60 seconds).

In the "gloves wait" state 610, the touchscreen controller detects and reports normal touches as the normal touches are present during a fourth timeout period 612 (e.g., 0.1 seconds) and transitions to the "gloves off" state 604. The state switches to the "gloves operation" state 608 if the normal touch disappears 611 before the fourth timeout period 612.

Figure 7:
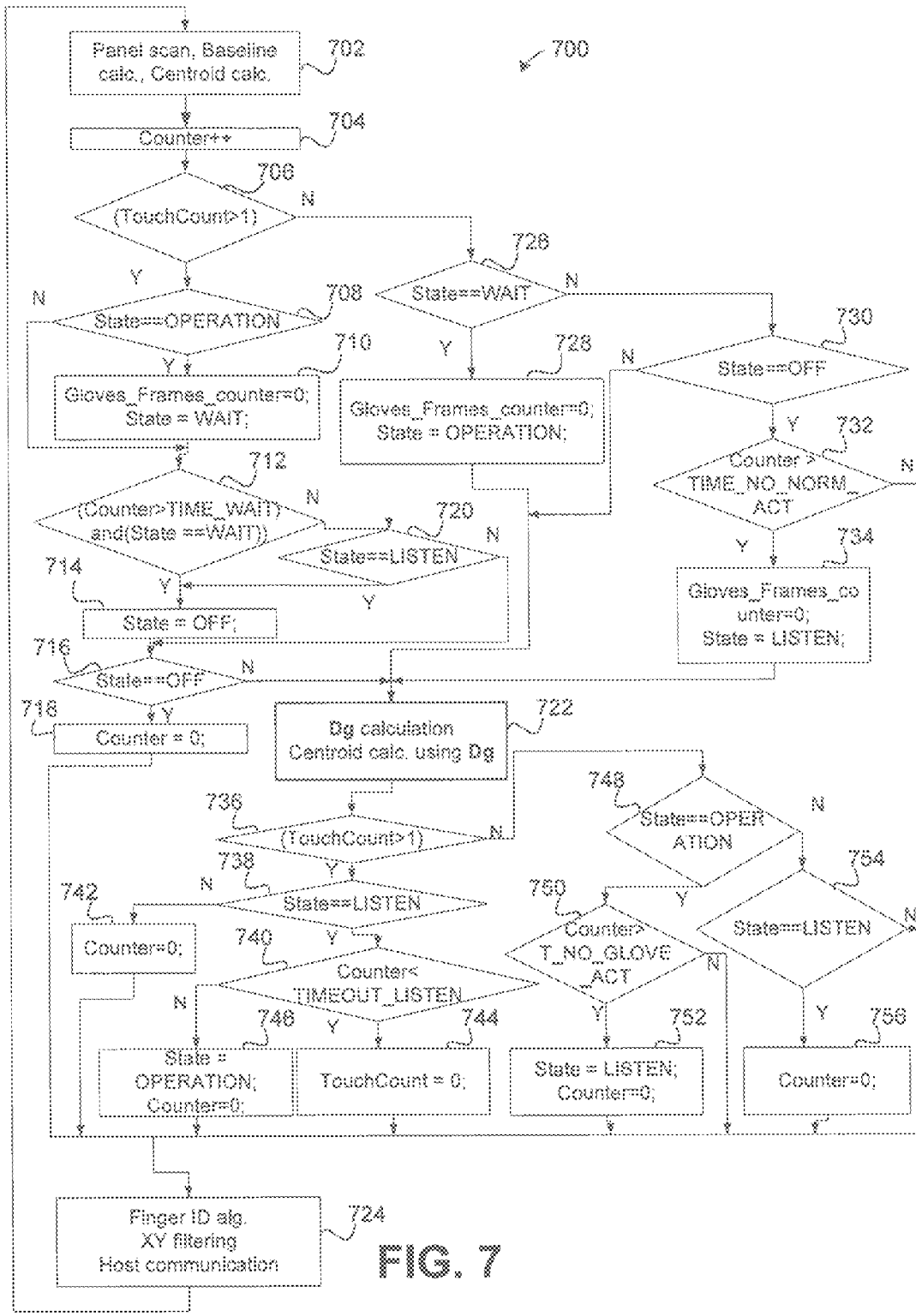
FIG. 7 is a flow diagram of a method of glove touch detection algorithm according to another embodiment.

FIG. 7 is a flow diagram of a method 700 of glove touch detection algorithm according to another embodiment. The method 700 may be performed by processing logic that may comprise hardware (circuitry, dedicated logic, etc.), software (such as is run on a general purpose computing system or a dedicated machine), firmware (embedded software), or any combination thereof. In one embodiment, the processing device 110 performs the method 700. In another embodiment, the glove touch detection tool 120 performs the method 700. Alternatively, other components of the electronic system 100 perform some or all of the operations of method 700.

Referring to FIG. 7, the method 700 begins with processing logic with a panel scan, a baseline calculation and a centroid calculation (block 702), and increments a counter (block 704). The processing logic determines if the touch counter is greater than 1 (TouchCount>1) (block 706). If the touch counter is greater than 1 at block 706, the processing logic determines if the state is in the "gloves operation" state (block 708). If yes at block 708, the processing logic sets a gloves frames counter (factor G in equation (2)) to zero and puts the state into "gloves wait" state (block 710); otherwise, if no at block 708, the processing logic skips the operation at block 710. At block 712, the processing logic determines if the counter is greater than a timeout associated with the "gloves wait" state and the state is in the "gloves wait" state (block 712). If yes at block 712, the processing logic sets the state to "gloves off" state (block 714), and the processing logic determines if the state is set to "gloves off" state (block 716). If no at block 712, the processing logic determines if the state is in the "gloves listen" state (block 720). If yes at block 720, the processing logic returns to block 714 to set the state to "gloves off" state; otherwise, the processing logic proceeds to block 722 in which the Dg matrix is calculated and a centroid is calculated using the Dg matrix. Also, if no at block 716, the processing logic proceeds to block 722; otherwise, the processing logic sets the counter to zero (block 718) and proceeds to block 724. At block 724, the processing logic can perform finger identification algorithms, XY filtering, and host communication operations. From block 724, the processing logic returns to block 702.

If the processing logic determines that the touch counter is not greater than 1, the processing logic determines if the state is in "gloves wait" state (block 726). If yes at block 726, the processing logic sets the gloves frames counter to zero and sets the state to "gloves operation" state (block 728) and proceeds to block 722). If at block 726 the processing logic determines that the state is not set to "gloves wait" state, the processing logic determines if the state is set to "gloves off" state (block 730). If not at block 730, the processing logic proceeds to block 722; otherwise, the processing logic determines if the counter is greater than a timeout period in which there is no normal activity detected (block 732). If yes at block 732, the processing logic sets the gloves frames counter to zero and sets the state to "gloves listen" state (block 734) and proceeds to block 722. If at block 732 the processing logic determines that the counter is not greater than the timeout period in which there is no normal activity detected, the processing logic proceeds to block 724.

At block 722, the processing logic calculates the Dg matrix and calculates a centroid calculation using the Dg matrix. The processing logic determines if the touch counter is greater than one (block 736). If yes at block 736, the processing logic determines if the state is "gloves listen" state (block 738). If yes at block 738, the processing logic determines if the counter is less than a timeout period associated with the "gloves listen" state (block 740). If at block 738 the processing logic determines that the state is not in the "gloves listen" state, the processing logic sets the counter to zero (block 742) and proceeds to block 724. If at block 740 the processing logic determines that the counter is less than the timeout period, the processing logic sets the touch counter to zero (block 744) and proceeds to block 724. If at block 740 the processing logic determines that the counter is not less than the timeout period, the processing logic sets the state to the "gloves operation" state and sets the counter to zero (block 746) and proceeds to block 724.

If at block 736 the processing logic determines that the touch counter is greater than one, the processing logic determines if the state is set to "gloves operation" state (block 748). If yes at block 748, the processing logic determines if the counter is greater than a timeout period in which there is no glove activity (block 750). If yes at block 750, the processing logic sets the state to "gloves listen" state and sets the counter to zero (block 752) and proceeds to block 724. If at block 750 the processing logic determines that the counter is not greater than the timeout period, the processing logic proceeds to block 724 without performing the operation at block 752. If the processing logic at block 748 determines that the state is not set to "gloves operation" state, the processing logic determines if the state is set to "gloves listen" state (block 754). If yes at block 754, the processing logic sets the counter to zero (block 756) and proceeds to block 724; otherwise, if at block 754 the processing logic determines that the state is not set to "gloves listen" the processing logic proceeds to block 724.

Figure 8:
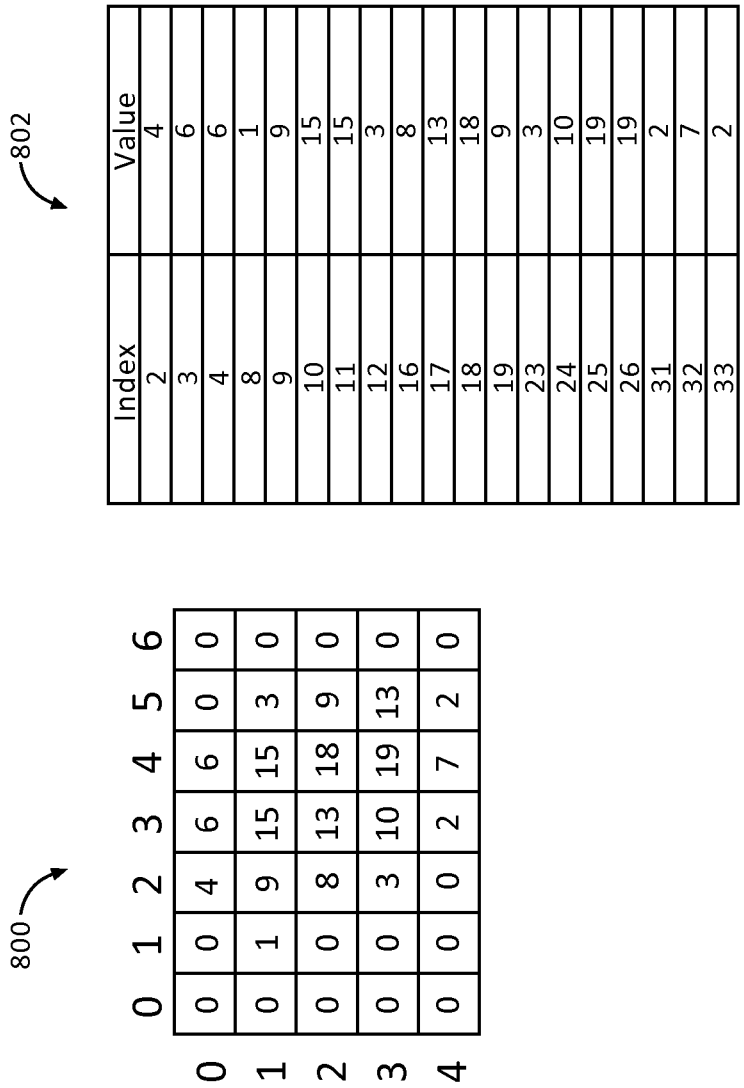
FIG. 8 illustrates a difference matrix and an indexed array according to one embodiment.

In one embodiment, the touchscreen controller can use M*N*2 bytes of RAM to collect and calculate Dg matrix. For example, if the touchscreen controller uses 22×28 scanning matrix, the touchscreen controller needs 1232 bytes RAM (E.g., 22*28*2=1232 bytes) to store Dg matrix. Usually all the cells of D matrix contain Zero value, except several cells with non-zero values if fingers are present on the panel (see FIGS. 5A and 5B). So it is not necessary to store all the cells of Dg matrix, but only non-zero values. One gloved finger touch can affect changes to 10-20 sensors cells (see FIG. 5B). So, a 64 cell array may be enough for Dg matrix to store differences data of at least 3 gloved finger touches. The touchscreen controller can use a 2*64 cell table to store Dg. The first column of the table can contain non-zero values of Dg, the second column can contain the index of a corresponding cell in D matrix. Thus, to store Dg differences data of at least 3 gloved finger touches only uses 256 bytes (e.g., 64 cells*2 columns*2 bytes=256 byte). FIG. 8 illustrates a difference matrix 800 and an indexed array 802 according to one embodiment. The different matrix 800 is a 7×5 matrix and can be presented as the indexed array 802.

In one embodiment, the touchscreen controller copies the values from an indexed array, which contains Dg values, to an array which represents D matrix in the project in order to run a standard centroid algorithm using a calculated Dg matrix. Then it is possible to run the standard Centroid algorithm. In one implementation, the algorithm can take about 1.3 ms in the "gloves listening" state, 3 ms in the "gloves operations" state and does not take any time if normal touches are detected. Alternatively, other processing time periods may be incurred.

In another embodiment, a part of the algorithm can be integrated into the Centroid algorithm. In this embodiment, the total gloves data processing (including the part in the Centroid algorithm) takes 0.4 ms in the "gloves listening" state, 2 ms in the "gloves operations" state and takes no time if normal touches are detected.

It should be noted that detection of fingers in thin gloves may results in difference values close to the finger reporting threshold, FingerThesthold value, and could be detected as a normal touch, but depends on the finger pressure. By adding the "gloves wait" state as described above, this may be resolved. If a gloved finger is detected, the FingerThesthold value for normal touches detection can be increased.

Figure 9:
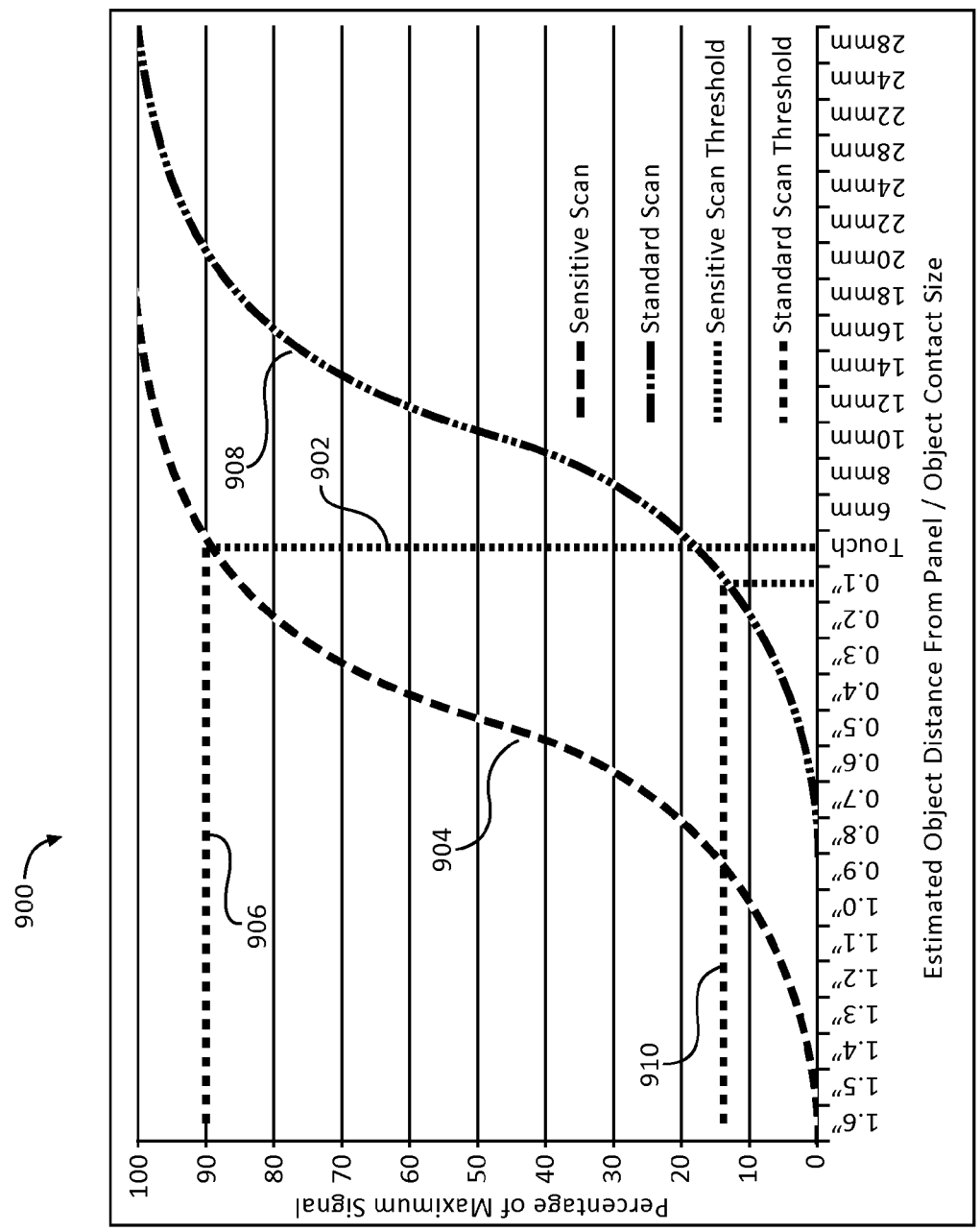
FIG. 9 is a graph illustrating sensitivity of a sensitive scan and a standard scan according to one embodiment.

FIG. 9 is a graph 900 illustrating sensitivity of a sensitive scan and a standard scan according to one embodiment. The graph 900 represents the percentage of the maximum signal of the sensitive scan and the standard scan in the y-axis and estimated object distance from the touchscreen and object contact size in the x-axis. More specifically, the estimated object distance is to the left of a touch 902 and the object contact size is to the right of the touch 902. During a sensitive scan, a measured signal 904 is compared to a sensitive scan threshold 906 that represents a saturation level of the sensitive scan. During the sensitive scan, any measured signal 904 that goes above the sensitive scan threshold 906 (e.g., 90% of maximum), causes the current scan method to change from sensitive scan to standard scan. Similar, during a standard scan, any measured signal 908 that goes below a standard scan threshold 910 (e.g., 14% of maximum), causes the current scan method to change from standard scan to sensitive scan.

In some embodiments, a measured signal 904, 908 in either the glove range or in the finger range are not automatically detected as touches and other detection criteria can also be used to detect them as touches. For example, one of the detection criteria may be hysteresis so as to prevent toggling between the sensitive scan and standard scan. Also, the transition from standard scan to sensitive scan could be prevented in software, since the use case for a real finger turning into a gloved touch so rapidly may not be possible.

The embodiments described herein may provide one or more benefits to the conventional solutions. For example, the embodiments described herein may result in significantly fewer false glove detections with approaching or hovering fingers and may result in significantly higher accuracy. The embodiments described herein can also provide interoperability with the low-accuracy stylus detection, as well as provide multi-touch support for both fingers and gloved fingers.

In embodiments where the touchscreen controller currently supports hierarchical scanning, as described herein, the addition of glove scanning could be added with the addition some additional storage for the glove tuning parameters.

In some embodiments, the algorithm described herein can be used to detect gloved finger operation for gloves with thickness up to 1.8 mm. The use of these gloved finger techniques does not affect the detection of ungloved touches. That is during the algorithm for gloved finger detection, there is no operation degradation of operating parameters.

As described herein, the embodiments of glove touch detection allow a user to perform time-critical operations with their devices without panicking to remove their gloves. For example, receiving a phone call while wearing gloves would almost always result in the call being missed. Now, using the glove touch detection embodiments, the user can receive the phone call while wearing gloves, as well as many other user interactions with the touchscreen. The embodiments may also allow a user full access to their device while wearing gloves, not just time-critical operations. This would be particularly attractive during activities where gloves are constantly worn; for example, driving, skiing, walking, etc. An in-car control system (entertainment or information system) with a touchscreen would be practically useless to a driver that wears gloves. Using the embodiments described herein, the driver that wears gloves could interact with the in-car control system.

As described above, a sensitive mutual-capacitance scan can be used to detect a finger even through a glove. An extra layer in the scanning hierarchy can be used to add the sensitive mutual-capacitance scan. Adding the extra layer in the scanning hierarchy may allow the performance of the other scanning methods to be unaffected by the addition of the sensitive mutual-capacitance scan for glove touch detection. Using mutual-capacitance scanning for the sensitive scan can allow for higher accuracy and multi-touch support.

In addition to the additional sensitive scan, additional processing may be used to improve the glove touch detection feature. For example, the glove touch data can be filtered to provide more robust rejection of false glove detections. In another embodiment, self-capacitance scan (or other advanced scanning methods) can be performed and the self-capacitance scan data can be used along with the sensitive mutual-capacitance scan to more accurately detect if a gloved touch is present.

The glove touch detection feature as described herein uses a scanning hierarchy to produce a similar range of data from all hierarchical levels. The tuning for each of the hierarchical levels is defined at the panel's design-time, and do not change thereafter. In another embodiment, the scanning method can be changed to dynamically adapt the scanning parameters, also called tuning parameters, such as prescaler, TX cycles, sub-conversions, thresholds, etc. Using this method, the scanning parameters would gravitate to a sensitive scan setting when no touches were detected. This would allow the detection of low signal objects like a stylus or a gloved touch. When a real finger touches the panel, the scan data would saturate and the scanning parameters would be updated to provide a less sensitive scan. In another embodiment, the scanning method can be configured to detect a wider range of input. This would allow the detection of low signal objects with the same scan as high signal objects. To preserve signal-to-noise (SNR), a much larger output range would also be necessary. A larger output range could be provided by one of the following: 1) Change the raw data from bytes (8-bit) to words (16-bit) or even double-words (32-bit). This would allow the detection of the sensitive scan data even when a large finger is pressed to the panel producing very large signals. 2) Change the processing of the data to provide a dynamic offset. If only small signals are detected, the offset is small. If large signals are detected the offset would be large and the small signals would be ignored. This is basically a simplification of the previous method, by using a sliding and possibly stretching window.

In another embodiment, the sensitive mutual-capacitance scan can be combined with a self-capacitance scan (or other scanning method) to produce useful information to more accurately detect the presence of a glove touch. In another embodiment, the pressure on the touchscreen could be detected. When combined with the lack of a capacitive signal, a gloved touch could be inferred. However, false touches could be a big problem with this method, for example from pocket litter. The pressure on the touchscreen could be measured by a pressure sensor that provides a pressure indicator to the touchscreen controller as one of the inputs to the algorithm. In one embodiment, the touchscreen controller receives a pressure indicator from a pressure sensor disposed in relation to the sense array and determines a presence of at least one of the hover type object, stylus type object, glove type object, or finger type object when the pressure indicator exceeds or does not exceed a pressure threshold.

In another embodiment, an accelerometer can be used to detect the "jolt" when the touchscreen is touched. However this method would incur the same false detection problems as with the pressure method above. The acceleration on the touchscreen could be measured by a sensor that provides an acceleration indicator to the touchscreen controller as one of the inputs to the algorithm. In one embodiment, the touchscreen controller receives an acceleration indicator from an accelerometer disposed in relation to the sense array and determines a presence of at least one of the hover type object, stylus type object, glove type object, or finger type object when the acceleration indicator exceeds or does not exceed an acceleration threshold.

It should also be noted that if only a subset of thin gloves is required, then the sensitive scan tuning could be much tighter resulting in a far more robust solution. If the subset was reduced enough, then only one "slight more sensitive" scan could be used to detect both finger touches and gloved touches. This could result in a poorer user experience for finger touches, as the finger would be detected before it touched the panel. A solution using two reporting thresholds could be used instead, but then a filter could be used on the lower threshold to reject approaching and hovering fingers.

Figure 10:
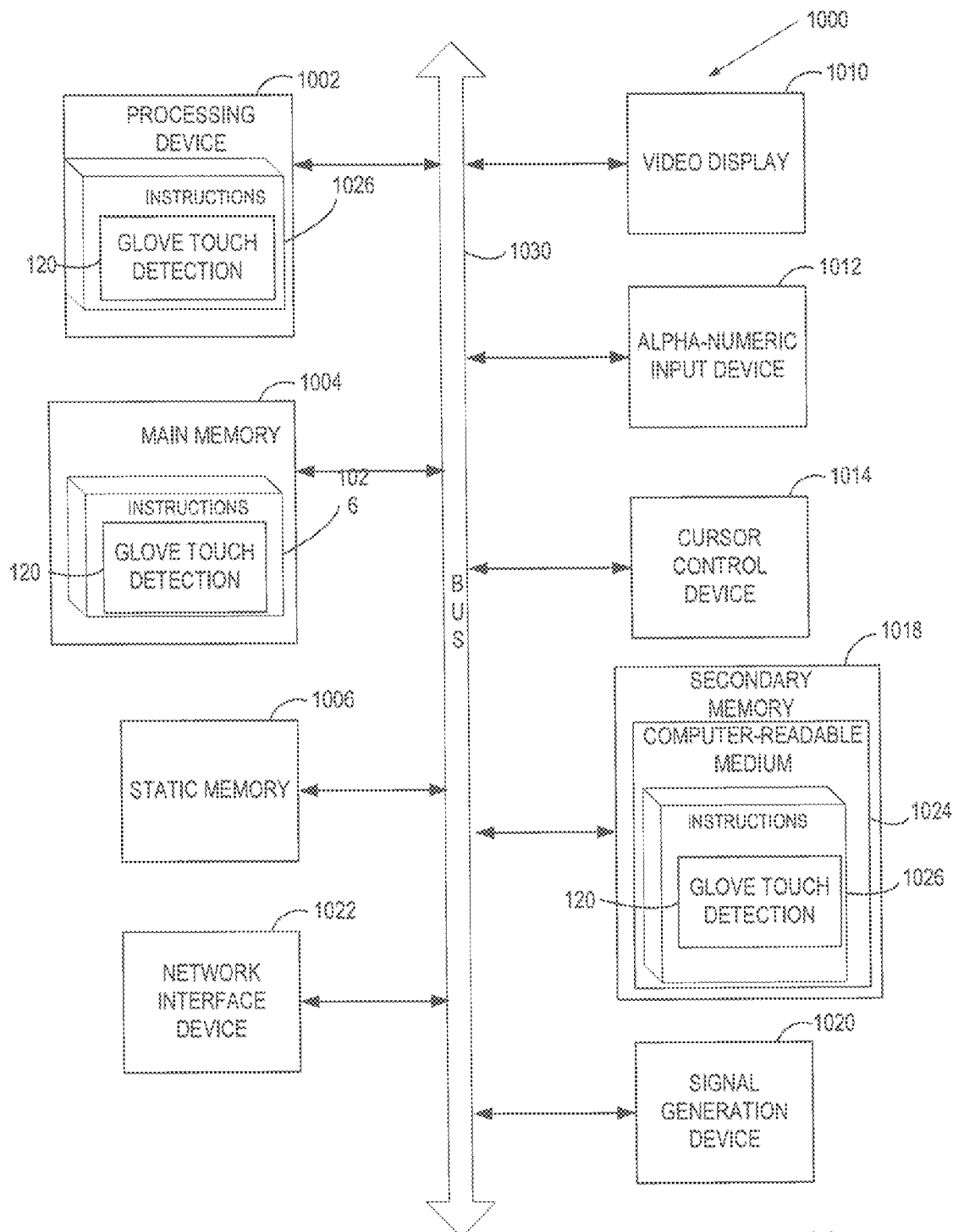
FIG. 10 is a diagram of one embodiment of a computer system for glove touch detection.

FIG. 10 is a diagram of one embodiment of a computer system for glove touch detection. Within the computer system 1000 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processing device 1002 (e.g., host processor 150 or processing device 110 of FIG. 1), a main memory 1004 (e.g., read-only memory (ROM), flash memory, dynamic random access memory (DRAM) such as synchronous DRAM (SDRAM) or DRAM (RDRAM), etc.), a static memory 1006 (e.g., flash memory, static random access memory (SRAM), etc.), and a secondary memory 1018 (e.g., a data storage device in the form of a drive unit, which may include fixed or removable computer-readable storage medium), which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute the instructions 1026 for performing the operations and steps discussed herein.

The computer system 1000 may further include a network interface device 1022. The computer system 1000 also may include a video display unit 1010 (e.g., a liquid crystal display (LCD) or a cathode ray tube (CRT)) connected to the computer system through a graphics port and graphics chipset, an alphanumeric input device 1012 (e.g., a keyboard), a cursor control device 1014 (e.g., a mouse), and a signal generation device 1020 (e.g., a speaker).

The secondary memory 1018 may include a machine-readable storage medium (or more specifically a computer-readable storage medium) 1024 on which is stored one or more sets of instructions 1026 embodying any one or more of the methodologies or functions described herein. In one embodiment, the instructions 1026 include instructions for the glove touch detection tool 120. The instructions 1026 may also reside, completely or at least partially, within the main memory 1004 and/or within the processing device 1002 during execution thereof by the computer system 1000, the main memory 1004 and the processing device 1002 also constituting machine-readable storage media.

The computer-readable storage medium 1024 may also be used to store the instructions 1026 persistently. While the computer-readable storage medium 1024 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 1026, components and other features described herein can be implemented as discrete hardware components or integrated in the functionality of hardware components such as ASICS, FPGAs, DSPs or similar devices. In addition, the instructions 1026 can be implemented as firmware or functional circuitry within hardware devices. Further, the instructions 1026 can be implemented in any combination of hardware devices and software components.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   at a touch sensitive device comprising a sense array having a plurality of sensor electrodes:
     operating in a glove mode, including performing a first scan of the sense array to detect an object proximate to the sense array using a first sensitivity parameter;
     comparing first touch data from the first scan against a first plurality of thresholds including a gloved-finger reporting threshold and a glove saturation threshold;
     in accordance with a determination that the first touch data does not exceed the gloved-finger reporting threshold, forgoing reporting of a touch event;
     in accordance with a determination that the first touch data exceeds the gloved-finger reporting threshold and does not exceed the glove saturation threshold, reporting a glove touch event; and
     in accordance with a determination that the first touch data from the first scan exceeds the glove saturation threshold, operating in a non-glove mode, including:
       performing a second scan of the sense array to detect a finger touch using a second sensitivity parameter;
       comparing second touch data from the second scan against a finger reporting threshold, wherein the finger reporting threshold is greater than the glove saturation threshold; and
       in accordance with a determination that the second touch data from the second scan exceeds the finger reporting threshold, reporting a finger touch event;
     wherein operating in the glove mode includes aggregating capacitance results from a first number of scans to generate the first touch data; and
     wherein the first number of scans exceeds a second number of scans utilized to generate the second touch data while in the non-glove mode.

2. The method of claim 1, further comprising:
   prior to performing the first scan of the sense array:
     performing a third scan of the sense array to detect at least one of a hover event or a stylus event using a third sensitivity parameter, wherein the third sensitivity parameter has increased sensitivity relative to the first sensitivity parameter;
     comparing third touch data from the third scan against a hover saturation threshold, wherein the hover saturation threshold is less than the gloved-finger reporting threshold; and
     in accordance with a determination that the third touch data from the third scan does not exceed the hover saturation threshold, reporting a hover event.

3. The method of claim 2, wherein the touch sensitive device is in a hover detect mode during the third scan.

4. The method of claim 1, wherein the second sensitivity parameter has decreased sensitivity relative to the first sensitivity parameter.

5. The method of claim 1, wherein comparing the second touch data from the second scan against the finger reporting threshold further includes comparing the second touch data from the second scan against a second plurality of thresholds that includes an initial reporting threshold and the finger reporting threshold.

6. The method of claim 5, further comprising:
   reporting a finger touch event in accordance with a determination that the second touch data from the second scan exceeds both the finger reporting threshold and the initial reporting threshold.

7. The method of claim 1, wherein performing the first scan comprises performing a first mutual-capacitance scan to measure first mutual capacitances between pairs of the plurality of electrodes using the first sensitivity parameter, and wherein performing the second scan comprises performing a second mutual-capacitance scan to measure second mutual capacitances between pairs of the plurality of electrodes using the second sensitivity parameter.

8. The method of claim 7, wherein the first mutual-capacitance scan is performed concurrently with a first self-capacitance scan and the second mutual-capacitance scan is performed concurrently with a second self-capacitance scan, and wherein self-capacitance data from the first and second self-capacitance scans is used with mutual-capacitance data from the first and second mutual-capacitances scans to detect the touch event corresponding to the gloved touch.

9. The method of claim 1, further comprising:
   in accordance with the determination that the first touch data from the first scan exceeds the glove saturation threshold, determining whether a mode change is appropriate based on one or more detection criteria; and
   in accordance with a determination that the mode change is appropriate, operating in the non-glove mode;
   wherein the one or more detection criteria include one or more of:
     a criterion that a timeout period for the glove mode has completed;
     a criterion that an acceleration exceeds an acceleration threshold; and
     a criterion that third touch data from a confirmation scan exceeds a touch threshold.

10. A touch sensitive device comprising:
    a sense array having a plurality of sensor electrodes;
    memory; and
    a processing element coupled to the memory and the sense array, wherein the processing element is configured to:
      operate in a glove mode, including performing a first scan of the sense array to detect an object proximate to the sense array using a first sensitivity parameter;

compare first touch data from the first scan against a first plurality of thresholds including a gloved-finger reporting threshold and a glove saturation threshold;

in accordance with a determination that the first touch data does not exceed the gloved-finger reporting threshold, forgo reporting a touch event;

in accordance with a determination that the first touch data exceeds the gloved-finger reporting threshold and does not exceed the glove saturation threshold, report a glove touch event; and in accordance with a determination that the first touch data from the first scan exceeds the glove saturation threshold, operate in a non-glove mode, including:

performing a second scan of the sense array to detect a finger touch using a second sensitivity parameter;

comparing second touch data from the second scan against a finger reporting threshold, wherein the finger reporting threshold is greater than the glove saturation threshold; and in accordance with a determination that the second touch data from the second scan exceeds the finger reporting threshold, reporting a finger touch event;

wherein operating in the glove mode includes aggregating capacitance results from a first number of scans to generate the first touch data; and wherein the first number of scans exceeds a second number of scans utilized to generate the second touch data while in the non-glove mode.

11. The touch sensitive device of claim 10, wherein the processing element is further configured to:

prior to performing the first scan of the sense array:

perform a third scan of the sense array to detect at least one of a hover event or a stylus event using a third sensitivity parameter, wherein the third sensitivity parameter has increased sensitivity relative to the first sensitivity parameter;

compare third touch data from the third scan against a hover saturation threshold, wherein the hover saturation threshold is less than the gloved-finger reporting threshold; and in accordance with a determination that the third touch data from the third scan does not exceed the hover saturation threshold, report a hover event.

12. The touch sensitive device of claim 11, wherein the touch sensitive device is in a hover detect mode during the third scan.

13. The touch sensitive device of claim 10, wherein the second sensitivity parameter has decreased sensitivity relative to the first sensitivity parameter.

14. The touch sensitive device of claim 10, wherein comparing the second touch data from the second scan against the finger reporting threshold further includes comparing the second touch data from the second scan against a second plurality of thresholds that includes an initial reporting threshold and the finger reporting threshold.

15. The touch sensitive device of claim 14, wherein the processing element is further configured to:

report a finger touch event in accordance with a determination that the second touch data from the second scan exceeds both the finger reporting threshold and the initial reporting threshold.

* * * * *